United States Patent [19]

Higashide et al.

[11] 4,125,874
[45] Nov. 14, 1978

[54] MULTIPLE PRINTER CONTROL

[75] Inventors: Carlos S. Higashide, Elk Grove Village; Paul G. Srodes, Arlington Heights, both of Ill.

[73] Assignee: Honeywell Inc., Minneapolis, Minn.

[21] Appl. No.: 841,180

[22] Filed: Oct. 11, 1977

Related U.S. Application Data

[63] Continuation of Ser. No. 650,220, Jan. 19, 1976, abandoned.

[51] Int. Cl.² .......................... G06F 3/04; G06F 3/12
[52] U.S. Cl. .................................................... 364/900
[58] Field of Search ... 364/200 MS File, 900 MS File; 179/15 AL; 197/1 R; 101/1

[56] References Cited

U.S. PATENT DOCUMENTS

| 3,456,242 | 7/1969 | Lubkin et al. ............... 364/200 X |
| 3,569,632 | 3/1971 | Beresin et al. .............. 179/15 AL |
| 3,632,881 | 1/1972 | Graham ....................... 179/15 AL |
| 3,639,694 | 2/1972 | Deutsch et al. ............. 179/15 AL |
| 3,725,871 | 4/1973 | Huettner et al. ............. 364/200 |
| 3,755,786 | 8/1973 | Dixon et al. ................ 179/15 AL |
| 3,771,135 | 11/1973 | Hueltner et al. ............. 364/200 |
| 4,034,351 | 7/1977 | Takezoe ...................... 364/200 |

*Primary Examiner*—Mark E. Nusbaum
*Attorney, Agent, or Firm*—Trevor B. Joike

[57] ABSTRACT

A system for remotely controlling the printing of data supplied by a central processing unit at a plurality of printers is disclosed having a central processing unit for addressing which printers are to print the data and for transmitting the data to be printed over a transmission channel to the printers, each printer having an address matcher to check if it is the printer being addressed and a latching circuit for conditioning the printer to receive and print data if it is one of the printers which is addressed. This circuit allows a plurality of printers to be addressed and requires only one transmission by the central processing unit of the data to the printers.

8 Claims, 25 Drawing Figures

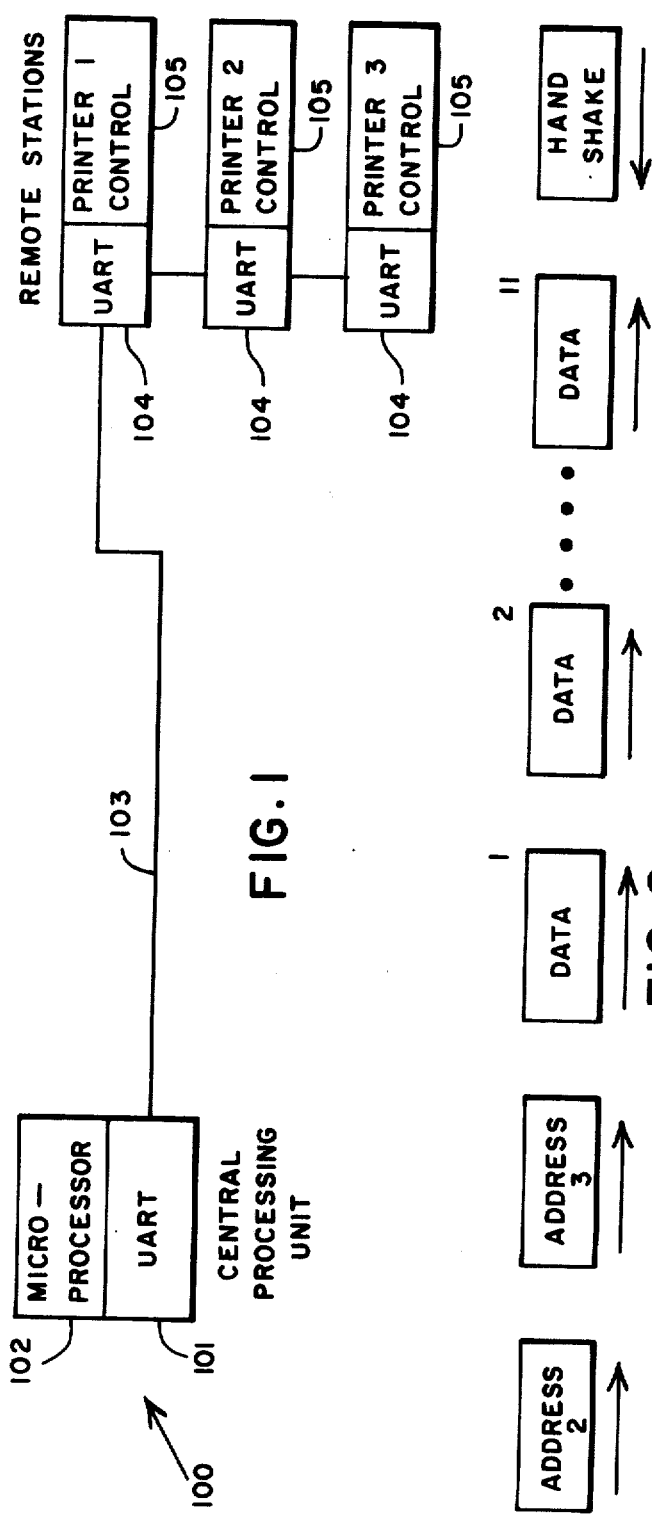
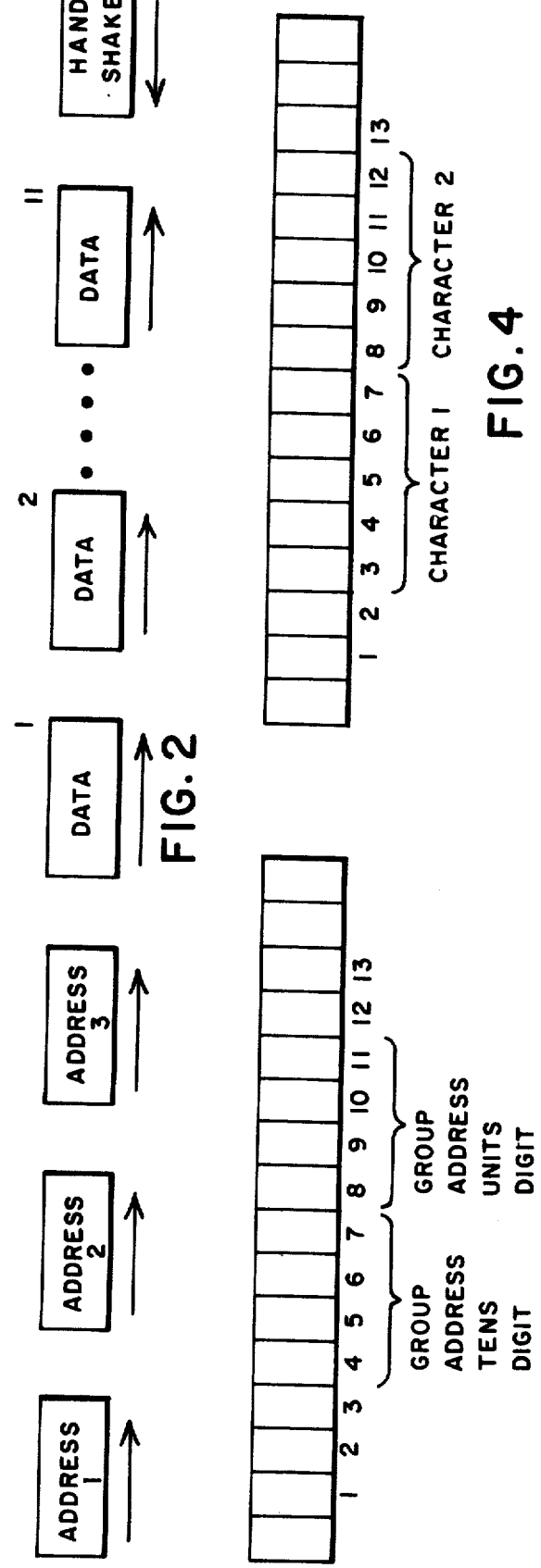
FIG. 1
FIG. 2
FIG. 3
FIG. 4

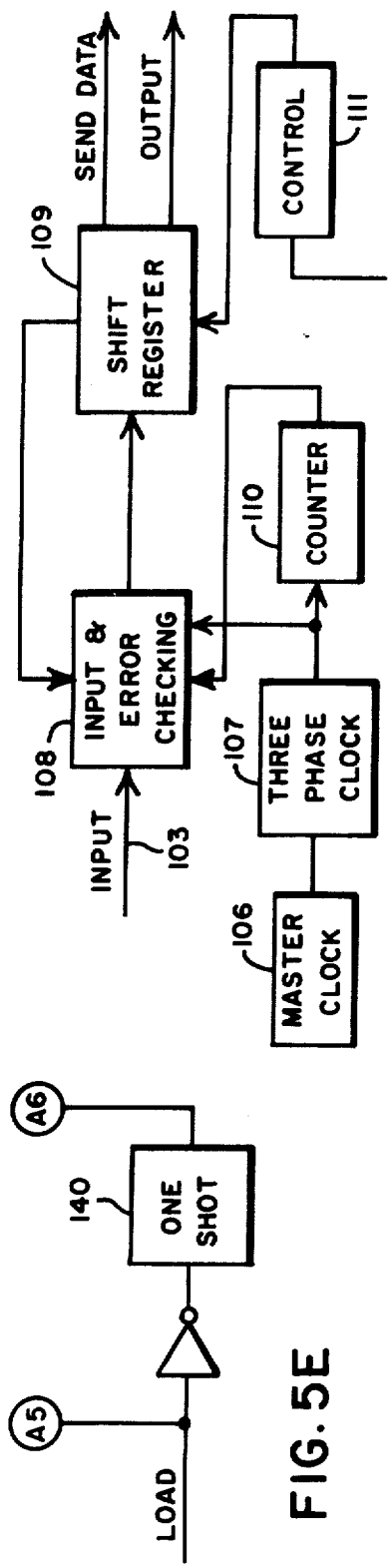
FIG. 5
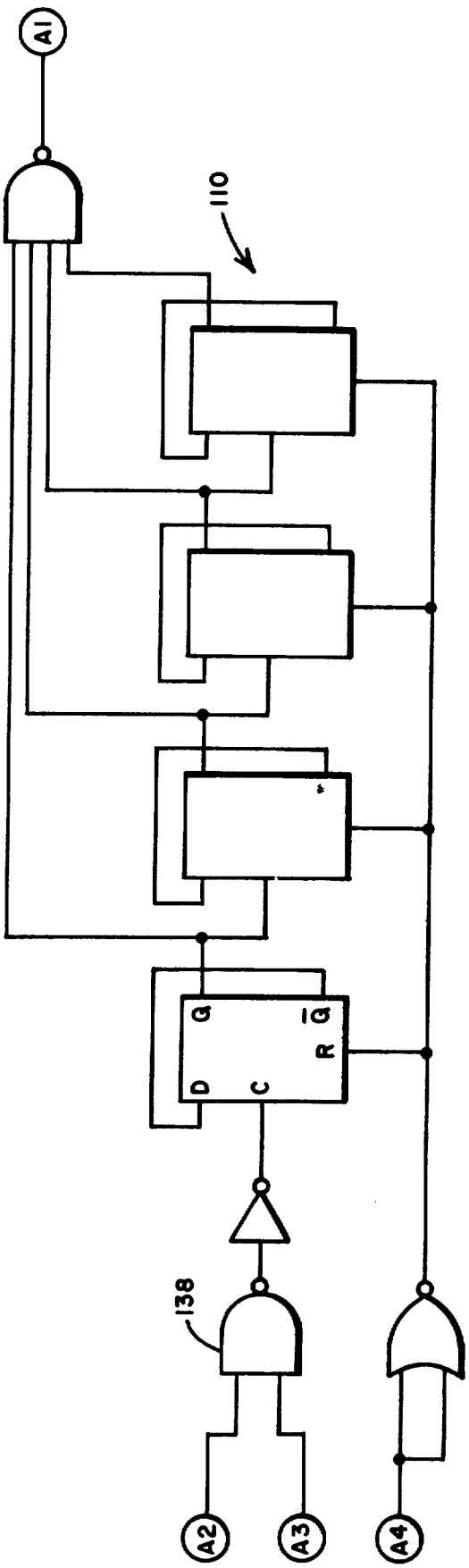
FIG. 5D
FIG. 5E

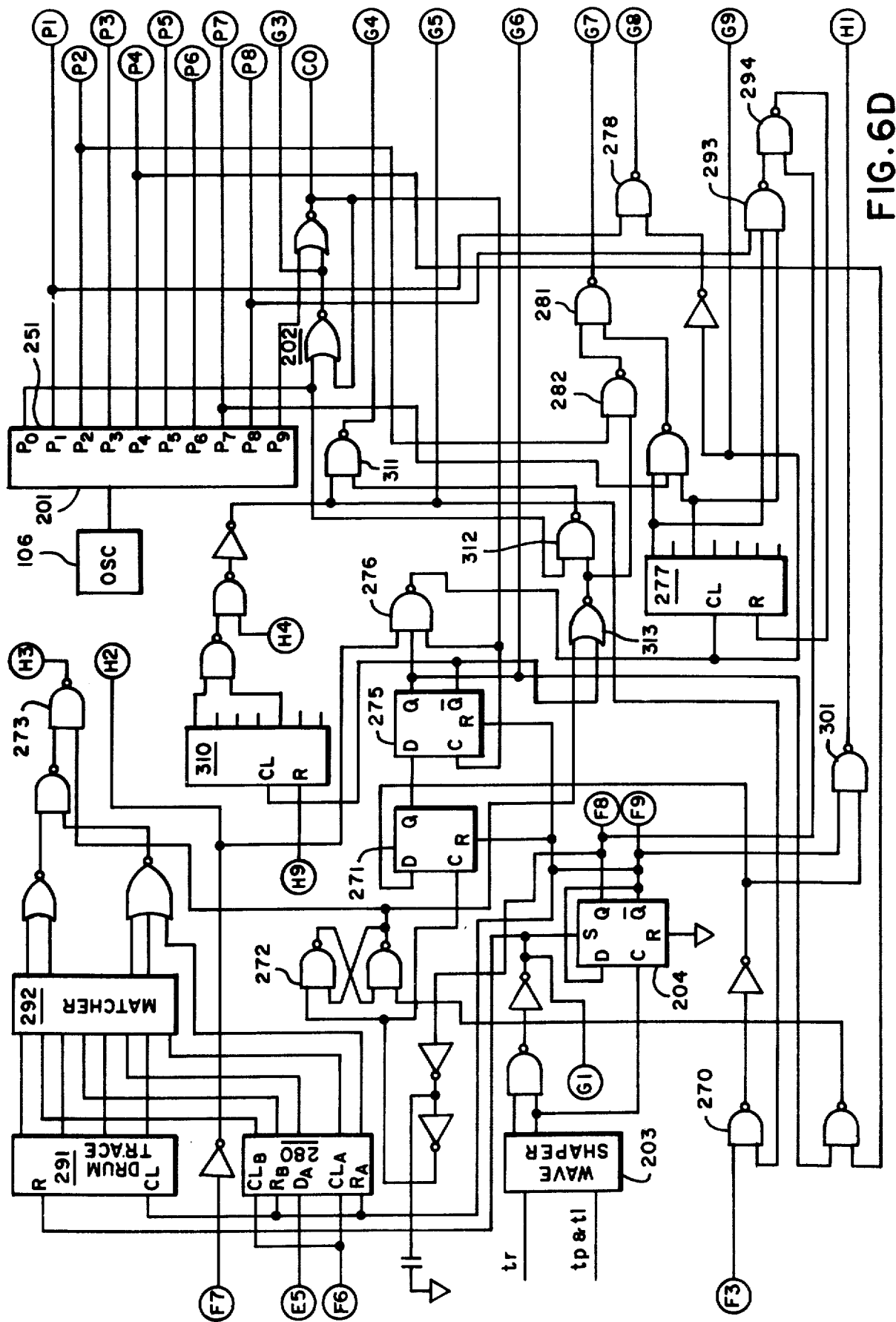

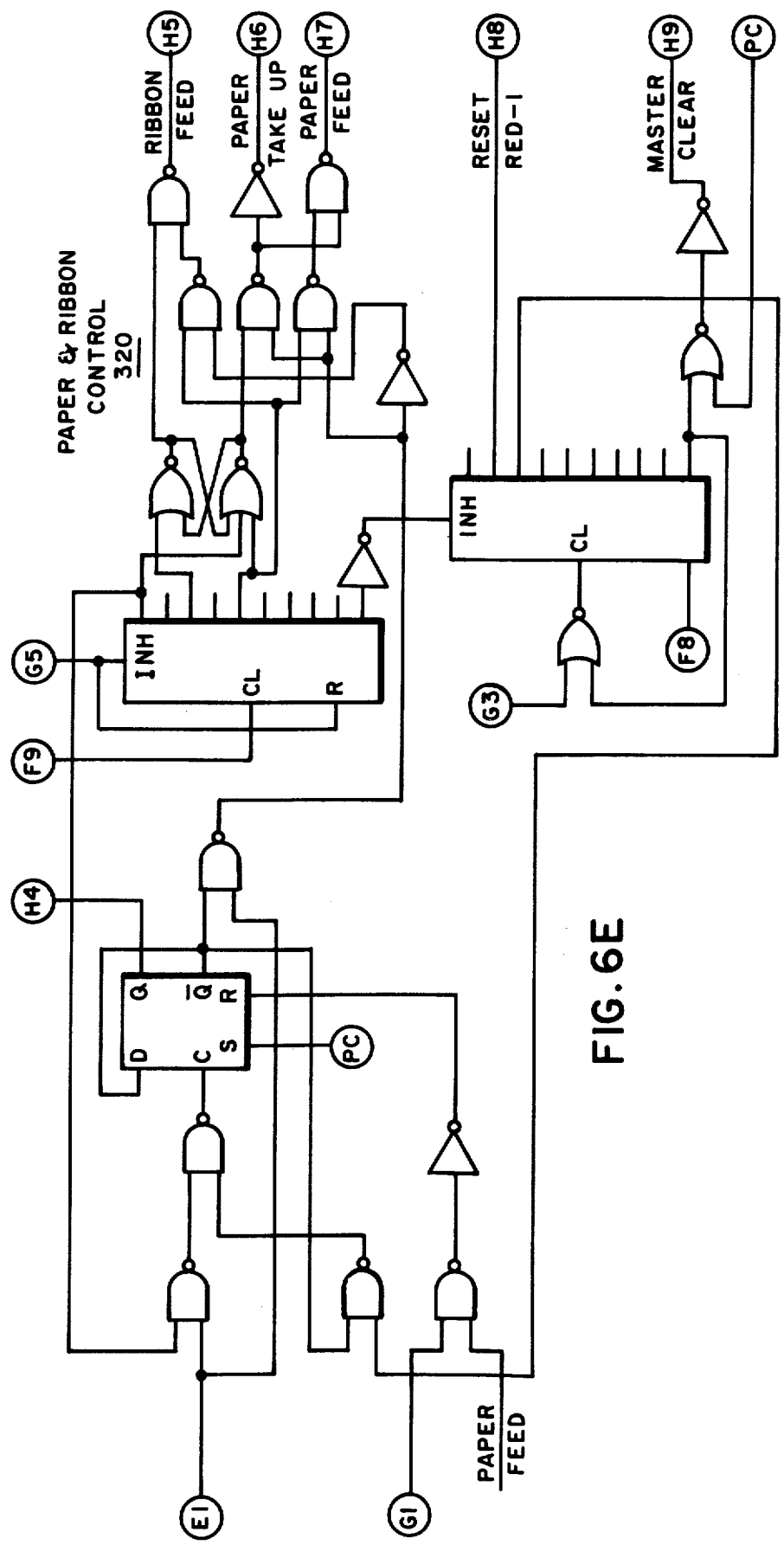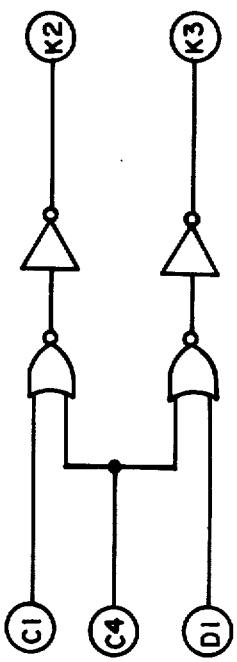
FIG. 6E
FIG. 6F

DRUM CHARACTER PATTERN

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 15 | T | Y | T | Y | / | . | . | / | . | . | . | . | . | F | T | Z | V | F | F | F | F |
| 14 | S | X | S | T | N | T | E | E | – | – | U | T | M | E | S | W | U | E | E | E | E |
| 13 | R | W | P | R | T | M | D | D | + | + | L | R | L | D | R | T | T | D | D | D | D |
| 12 | P | V | I | O | S | L | C | C | C | C | O | G | C | P | S | R | C | C | C | C |
| 11 | O | U | F | L | P | D | B | B | B | B | N | E | B | O | P | Q | B | B | B | B |
| 10 | N | T | A | A | C | A | A | A | A | A | A | B | A | M | O | O | A | A | A | A |
| 9 | M | S | 9 | 9 | 9 | 9 | 9 | 9 | 9 | 9 | 9 | 9 | 9 | K | N | N | 9 | 9 | 9 | 9 |
| 8 | L | R | 8 | 8 | 8 | 8 | 8 | 8 | 8 | 8 | 8 | 8 | 8 | I | M | M | 8 | 8 | 8 | 8 |
| 7 | H | N | 7 | 7 | 7 | 7 | 7 | 7 | 7 | 7 | 7 | 7 | 7 | H | L | I | 7 | 7 | 7 | 7 |
| 6 | G | L | 6 | 6 | 6 | 6 | 6 | 6 | 6 | 6 | 6 | 6 | 6 | G | K | H | 6 | 6 | 6 | 6 |
| 5 | F | F | 5 | 5 | 5 | 5 | 5 | 5 | 5 | 5 | 5 | 5 | 5 | F | I | G | 5 | 5 | 5 | 5 |
| 4 | E | E | 4 | 4 | 4 | 4 | 4 | 4 | 4 | 4 | 4 | 4 | 4 | E | F | F | 4 | 4 | 4 | 4 |
| 3 | D | D | 3 | 3 | 3 | 3 | 3 | 3 | 3 | 3 | 3 | 3 | 3 | D | E | D | 3 | 3 | 3 | 3 |
| 2 | C | C | 2 | 2 | 2 | 2 | 2 | 2 | 2 | 2 | 2 | 2 | 2 | C | J | C | 2 | 2 | 2 | 2 |
| 1 | B | B | 1 | 1 | 1 | 1 | 1 | 1 | 1 | 1 | 1 | 1 | 1 | B | C | B | 1 | 1 | 1 | 1 |
| 0 | A | A | 0 | 0 | 0 | 0 | 0 | 0 | 0 | 0 | 0 | 0 | 0 | A | A | A | 0 | 0 | 0 | 0 |

FIG. 9

MULTIPLE PRINTER CONTROL

This is a continuation of application Ser. No. 650,220, filed Jan. 19, 1976, now abandoned.

BACKGROUND OF THE INVENTION

This invention is related to the printing of data supplied to a plurality of remote printers from a central processing unit over a common transmission channel.

Prior art communication systems, for example controlling the environment within a building or fire and security conditions within a building, having a central panel for providing alarm indications or indications of the status of various points within the building, originally provided a separate wire running from the panel to each point which was being monitored. In today's large buildings, however, the costs of wiring in this manner can be prohibitive. Therefore, the prior art replaced these plurality of wires by a single transmission channel running from the central processing unit to the remote points being monitored.

The central processing unit is capable of scanning the status of the various remote points and controlling various operations at the remote points by addressing in turn each remote point and requiring the remote points to take some action. The action may be to report back its present status, such as temperature, pressure or humidity, or to perform some operation such as starting or stopping a fan, opening a damper or whatever. By using a single transmission channel, the cost of installation of these monitoring systems is greatly reduced.

Such communication systems must perform a variety of services other than scanning and performing operations at remote points. Indications of the status of the remote points must be given and recorded which function is often performed by printers. In a typical system the printer will print out any changes in status of the remote points. It is also desirable for the printer to print logs of the status or occurrences at the remote pointers. In the present invention, the printer has access to the central processor to request the transmission of certain data so that the printer can print it. The printer used in the present invention is a rotary drum printer.

Such rotary drum printers have a printing drum with characters arranged in a plurality of columns and rows. Paper is fed between this drum and a plurality of firing hammers, each hammer associated with a corresponding column of characters and the printing operation is accomplished by firing a hammer which strikes the paper to the character leaving imprinted on the paper the character on the drum associated with that hammer.

Data to be printed which is transmitted by a central processor typically comprises a plurality of bits and the bits are divided into groups of four or five, each group representing a character to be printed. The data is transmitted, usually, a line at a time. A plurality of bits, comprising a plurality of characters, are supplied to the printer which stores them and then pulls out the data bits, a character at a time, for comparison with the present drum position of the printer. Each character to be printed corresponds to a particular character in a particular column on the drum. If the drum presents its first row of characters to the hammers only certain stored characters will correspond to the characters in that row. Thus, only those hammers relating to the characters in the row which match the stored characters will be fired.

The drum rotates to a new row after the hammers have been fired at the first row. The stored characters are compared with the new drum position and new corresponding hammers are fired. This operation continues until all rows have been compared with the stored characters. As the last row is compared, the entire line will have been printed and the printer can print a new line of data from the central processor.

In the prior art, when data is to be printed at more than one printer, the first printer must be addressed by the central processing unit and the central processing unit must then send out the data; the central processing unit must then address the second printer and send out the data to be printed again and so on. This operation will continue until all printers, which have been selected by the central processing unit, have printed out the data. As will be noted, this operation requires the data to be sent out once for each printer which is to print the data.

The present invention, however, allows the central processing unit to send out a plurality of addresses each designating a selected printer to print the data and then send out the data in only one transmission for printing by the selected printers. In the present system, each word sent over the transmission line is sent twice, the first during the first half of the transmission and the second during the second half of transmission. Thus, the first half can be compared to the second half, bit by bit, to detect any possible errors in transmission. Therefore, "transmission" is defined here as either sending out word messages only once, or more than once for purposes other than sending out data in the prior art method of transmitting data a number of times depending upon how many printers are to print the data.

SUMMARY OF THE INVENTION

The invention is able to send data in only one transmission for printing by a plurality of printers by providing a central processing means for transmitting addresses associated with the printers selected to print data and for sending out the data to be printed over a common transmission line to the printers. Each printer has an address field which specifically identifies that printer and, as an address is received over the transmission line, each printer compares the address with its own address field to see if it is the printer addressed by the central processing unit. If it is the printer selected by the central processing unit, it operates a latch which conditions the printer control circuit for receiving and printing out the data transmitted by the central processing unit. Once the latch has been set, the printer waits for data to be sent. If the central processing unit addresses other printers to print out the data, the latch stays set looking for data. Once all of the selected printers have been addressed by the central processing unit, the central processing unit transmits the data which is received by each of the selected printers and the printing operation is begun.

BRIEF DESCRIPTION OF THE DRAWINGS

These and other features of the invention will become apparent from a review of the drawings in which:

FIG. 1 is a block diagram showing the central processing unit and the remote stations;

FIG. 2 shows the data transmission of words between the central processing unit and the remote stations of FIG. 1;

FIG. 3 shows an address word made up of a plurality of bits;

FIG. 4 shows a data word made up of a plurality of bits;

FIGS. 6A–6G show the details of the printer control circuit shown in FIG. 1;

FIG. 9 shows the character geography of a drum of a typical rotary drum printer.

DETAILED DESCRIPTION OF THE DRAWINGS

Figure 5A:
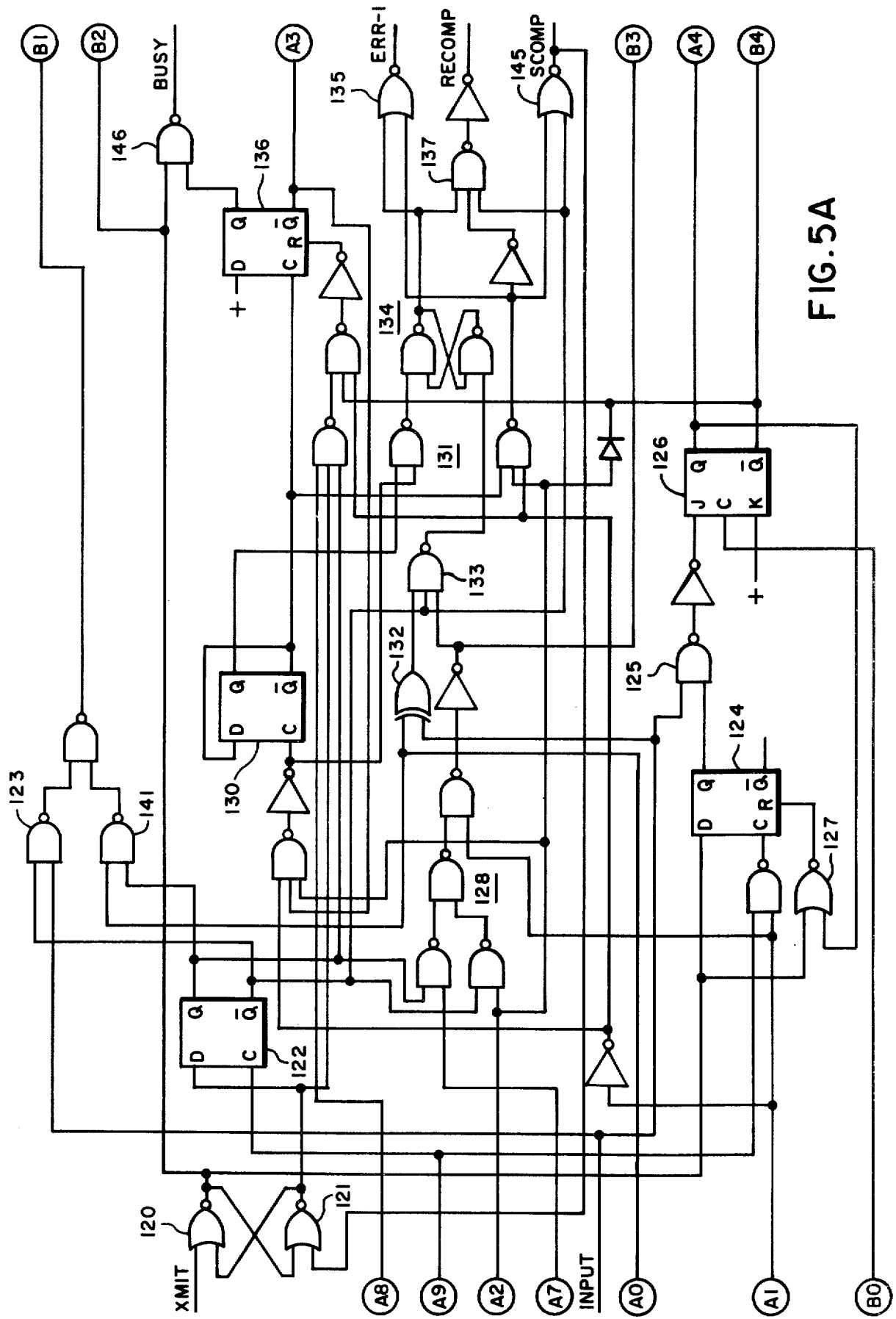
FIGS. 5–5E show the universal asynchronous receiver transmitter at the CPU and each of the printers.

The general communication system is shown in FIG. 1 and comprises a central processing unit 100 having a universal asynchronous receiver transmitter 101 for transmitting and receiving messages over a transmission channel 103 and a microprocessor 102 for providing the addressing and control functions of the central processing unit. The communication channel 103 is also connected to a plurality of remote stations which are shown as printer controls. Specifically, three printers have been shown, each comprising a universal asynchronous receiver transmitter 104 and a printer control 105. The universal asynchronous receiver transmitters 101 and 104 are the same apparatus that are shown in more detail in FIGS. 5–5E. The microprocessor can be the National Semiconductor, Inc. IMP 16C model.

The central processing unit 100 communicates with the printers by transmitting messages over the transmission line 103, a representative sample of the messages being shown in FIG. 2. The central processor, when data is to be printed by selected printers, first transmits the address words for the selected printers. As shown in FIG. 2, all three printers are addressed and all will, therefore, receive and store the data transmitted by the central processing unit in a single stream of data transmission. A single transmission may be the sending of data only once or may be the sending of the data in a first half of the transmission and sending the data again in a second half of the transmission for error checking. After all data is received by the selected printers, a further selected printer may transmit back the last data word as a handshake feature to indicate that all data has been received without error.

An address word takes the form of FIG. 3. The first and last two bits which are unnumbered are the start and stop bits respectively. Bits 1 and 2 indicate whether the word is an address word or a data word. Bits 3 and 12 indicate whether the remote station is being polled for information, whether a handshake feature is to be provided or whether a handshake feature is not to be provided. For polling, bits 3 and 12 are set with a 0 which indicates to the printer control that it should transmit back any information it may have. For the provision of a handshake signal, bits 3 and 12 are provided with a 1 which requires the printer receiving an address word with bits 3 and 12 set with a 1 to transmit back the last word received. When the remote station receives a polling address word from the central processing unit, the remote station scans its status switches and, if no switch has been set, the remote station sends back the address word to the central processing unit which informs this unit that the remote station has no status information to report. If one of these bits is a 1 and the other is a 0, no handshake will be provided. Bits 4 through 7 are the tens digit for the address and bits 8 through 11 are the units digit for the address.

A data word is shown in FIG. 4. Bits 1 and 2 again are to inform the remote station whether the word is an address word or a data word. Bit 2 provides a directive flag which informs the printer control unit that the data word having a 1 set therein is the last data word in that transmission. Bits 3 through 7 form one character of data transmitted and bits 8 through 12 form a second character of data transmitted. As many data words may be transmitted as are capable of being stored by the printer control.

The circuits within each printer control circuit and universal asynchronous receives transmitter circuit at the remote stations are the same and, therefore, only one is shown in detail in the subsequent figures. FIG. 5 shows a generalized block diagram for the universal asynchronous receiver transmitters 101 and 104 shown in FIG. 1. The universal asynchronous receiver transmitter is driven by a master clock which drives the various clock generators for providing the timing signals necessary for operating the universal asynchronous receiver transmitter. The output for master clock 106 drives three phase clock 107 which produces three outputs for generating timing signals for the rest of the circuit. The input data received over transmission line 103 is fed through input and error checking circuit 108 and stored in shift register 109 under the control of the three phase clock and is shifted out of the shift register back into input and error checking circuit 108 which checks the first half of the transmission of the message on line 103 with the second half of the transmission bit by bit. The error checking is accomplished under the control of counter 110 which counts the number of bits within a message for controlling the error checking done by circuit 108. When the error checking operation is completed, the message is then provided at the output of the shift register. The output actually comprises a plurality of lines. Any message provided by a load 111, which may be a remote station in the form of a printer control, security or fire monitoring station or environmental control station, can provide an input to the shift register 109 for sending data back out over the transmission channel 103 to the central processing unit.

The specific apparatus within the general boxes is shown in more detail in FIGS. 5A–5E. The terminals AO–A9 and BO–B4 show how these circuits are interconnected. The attached Appendix may be referred to for a functional description of each terminal.

Figures 5B, 5C:
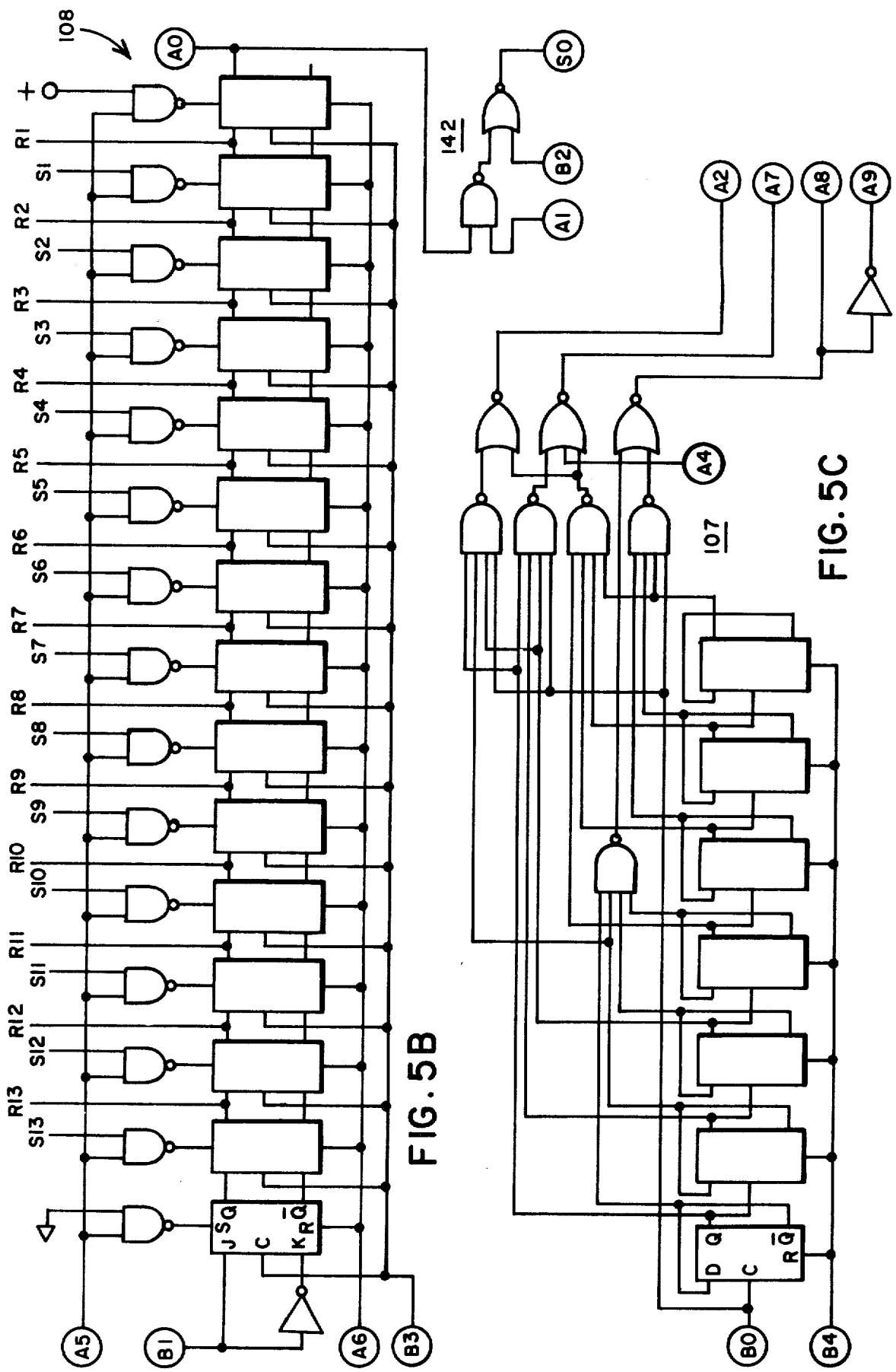

During standby conditions, when the universal asynchrohous receiver transmitter is in a condition to receive input data over the transmission line, transmit flip-flop 120–121 in FIG. 5A is in a condition where the output from NOR gate 120 is 1 and the output from NOR gate 121 is 0. The mode Flip-flop 122 is reset to allow any incoming data to pass through NAND gate 123 to terminal B1 for shifting through the shift register shown in FIG. 5B.

The master clock 106 provides an input at terminal B0 to the three phase clock 107 which produces its output at terminals A2, A7, A8, and A9 for controlling the timing of the circuit of FIG. 5A and for driving the count of 15 counter 110 of FIG. 5D. Moreover, the O output from NOR gate 120 is clocked by D flip-flop 124 to the input of NAND gate 125.

Upon receipt of the first message over the transmission line, the first message is received on the input terminal of the circuit shown in FIG. 5A and the start bit of the message is transmitted through NAND gate 125 to the J terminal of J flip-flop 126 which is clocked by the output by the master clock 106. The outputs from the J flop 126 are presented on terminals A4 and B4 for resetting the count of 15 counter 110 and the three phase clock 107. The Q output from flip-flop 126 is also connected through NOR gate 127 to reset the D flip-flop 124 to prevent any further bits from being transmitted through the NAND gate 125.

The incoming message is also supplied to the NAND gate 123 and is transmitted therethrough to terminal B1 for storing in the shift register 108. The input data word is shifter through the shift register 108 under the control of logic circuitry 128 which provides an output at terminal B3 dependent upon the three phase clock 107 which has inputs to the logic circuitry 128 at teminals A2 and A7.

As the incoming message is shifted through shift register 108, the count of 15 counter 110 is, in effect, counting the bits of the message and when a count of 15 is reached it produces an output on terminal A1 which clocks the O from NOR gate 120 through D flip-flop 124 to condition NAND gate 125 to receive another message on the input, momentarily inhibits logic circuitry 128 from supplying any further pulses to the clock terminals of shift register 108 and operates the half cycle flip-flop 130 to reverse its Q and Q outputs. When the half cycle flip-flop 130 operates, it conditions logic circuitry 131 to provide the ERR-1 (error), RECOMP (receive complete), and/or SCOMP (send complete) signals upon the completion of the error checking cycle.

The error checking cycle is begun as the count of 15 counter 110 begins its next count of 15. The information which was stored in the shift register 108 is clocked out under the control of logic circuitry 128 and presented at terminal AO to comparator EXCLUSIVE OR gate 132. The other side of the EXCLUSIVE OR gate receives the second half of the transmission from the input line and compares the second half of the transmission with the first half of the transmission stored in shift register 108 bit by bit. At the same time, the second half of the transmission is supplied through NAND gate 123 and shifted into the shift register 108 as the first half of the transmission is shifted out. If there is an error in transmission, i.e. a bit of the first half of the transmission and the second half of the transmission do not match, gate 132 provides an output through NAND gate 133 to Error Latch 134 to provide an error output through NOR gate 135. Assuming, however, that there is no error in transmission, the second count of 15 output from count of 15 counter 110 operates flip-flop 130 to provide a clock signal to stop flip-flop 136 and to operate logic circuitry 131 to provide an output to NAND gate 137 which produces a receive complete signal. When the stop flip-flop 136 operates, it provides an output to the NAND gate 138 of the count of 15 counter 110 to inhibit any further clocking signals from the three phase clock at terminal A2. Thus the output terminal A1 is maintained at a state which prohibits the logic circuitry 128 from producing any further clocking signal to the shift register 108. The message which was transmitted is stored in shift register 108 and appears at terminals R1-R13 as an output from the universal asynchronous receiver transmitter. The error signal from NOR gate 135 also provides an output from the universal asychronous receiver transmitter as does the receive complete line. The universal asynchronous receiver transmitter is now in a condition to receive any further messages transmitted to its input.

If the remote station or central processing unit associated with the universal asynchronous receiver transmitter has any information to transmit, the remote station or central processing unit provides both a transmit pulse to NOR gate 120 and a load pulse to the input of the circuit shown in FIG. 5E. The load pulse triggers a one shot circuit 140 which provides an output to terminal A6 which clears the shift register 108 and also produces an output at terminal A5 which loads in the message to be transmitted appearing on terminals S1-S13 of the shift register 108 through associated NAND gates. When NOR gates 120 and 121 reverse their outputs, the 0 at the output from NOR gate 120 is clocked through D flip-flop 124 to disable the receiving logic. Also, mode filp-flop 122 is operated to condition NAND gate 141 to shift the message in shift register 108 back into the register 108 while it is being shifted out on the transmission line. As the logic circuitry 128 is providing the clocking pulse to the shift register 108, the message stored in register 108 is shifted out at terminal AO and is also shifted out through send logic circuitry 142 which has been conditioned to transmit the pulses at terminal AO by an input from terminal B2 which is connected to the output at NOR gate 120. The message shifted through the logic circuitry 142 is supplied to the transmission line and is also supplied to terminal AO of FIG. 5A which is connected through NAND gate 141 to the input of the shift register. As the first half of the transmission is completed, the count of 15 counter 110 provides an output which triggers half mode flip-flop 130 to condition stop flip-flop 136 to stop the transmission after the second half of the transmission. As the message is clocked out on the line a second time, the count of 15 counter 110 will provide an output at the end of the second half of the transmission which prevents logic circuitry 128 from providing any more clocking signals to the shift register 108. The count of 15 counter ceases operation due to the output from stop flip-flop 136 on terminal A3 which inhibits any further three phase clock pulses from being supplied to the clocking terminal of count of 15 counter 110. At the same time, an input is supplied to NOR gate 145 which provides a send complete signal and which also resets the transmit latch 120–121.

When originally latch 120–121 is set indicating that the universal asynchronous receiver transmitter is in a transmitting mode, an output is supplied through NAND gate 146 which is a busy signal to inform the central processing unit or the remote station that the universal asynchronous receiver transmitter is busy transmitting data. The output from NOR gate 145 resets the transmit latch 120–121 and the universal asynchronous receiver transmitter is now in a condition to either transmit or receive messages.

Figure 6:
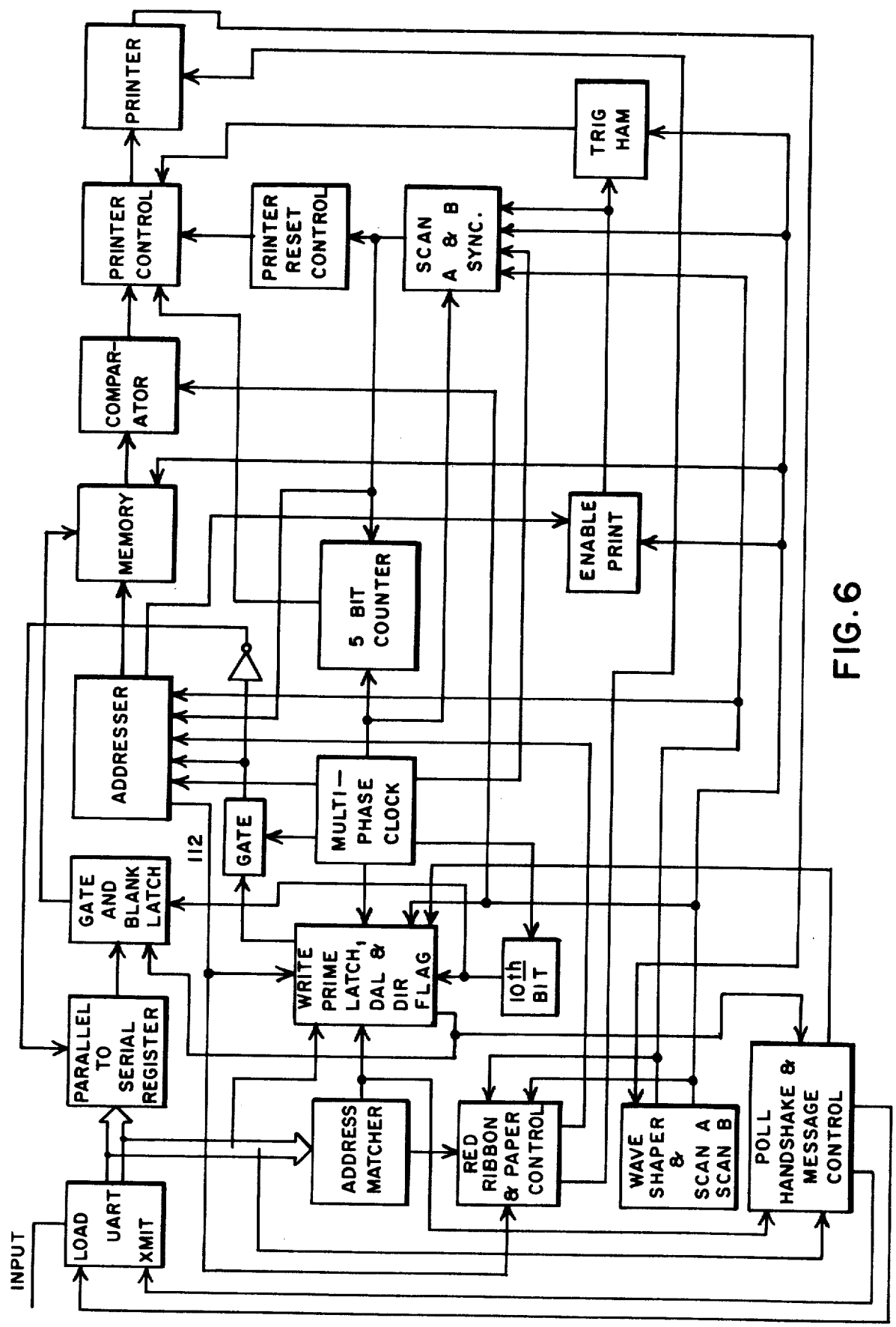
FIG. 6 shows a general block diagram of the printer controls shown in FIG. 1.

The universal asynchronous receiver transmitter shown in FIGS. 5–5E provides for receiving and transmitting meassages to and from both the central processing unit and the remote station. When the remote station is a printer, FIG. 6 shows how the universal asynchronous receiver transmitter is connected to a generalized block diagram of a printer control circuit. When the central processing unit desires a printer to print out data, it first addresses the printer by sending an address word over the transmission channel which word is received at the input to the universal asynchronous receiver transmitter. The universal asynchronous receiver transmitter presents this address word over its 13-bit output bus to an address matcher which compares the address of the message stored in the universal asynchronous receiver transmitter with the address field associated with that particular printer.

If there is a match, the address matcher provides an output through the poll, handshake and message control circuit which looks at bits 3 and 12 of the output from the UART to determine if the message indicates a desire for a status report or for a printout of data and, if so, whether a handshake is to be provided. If the status of its switches are desired (polling) and at least one switch has been operated, the poll, handshake and message control circuit provides both a load signal which loads into the universal asynchronous receiver transmitter the status of the switches and a transmit pulse which transmits this status back to the central processing unit. If no switch has been operated, only a transmit pulse is generated returning the address word bact to the CPU. If the address word does not contain a poll command, the message sets the write prime latch of the write prime latch, DAL and directive flag circuit and, if a handshake is to be provided, the handshake latch in the poll, handshake and message control circuit is operated.

With the write prime latch set, the printer control circuitry is now in a condition to receive data out of the universal asynchronous receiver transmitter and begin the printing operation. As soon as the data word is received and appears at the output of the universal asychronous receiver transmitter, the data available latch (DAL) is set and the word is loaded into the parallel to several register for shifting into the memory. Under the control of the scan A and scan B outputs from the wave shaper and scan A and scan B sync circuit and the multi-phase clock, and addresser is incremented to write into the memory circuit the output from the parallel to serial register. The last data word of the data to be printed carries a directive flag bit. When this bit is received, it provides an output to the poll, handshake and message control circuit to transmit back, if the handshake latch has been set, the last word received to inform the central processing unit that all data words have been received without error.

At the same time, if all 112 storage locations in one half of the memory have not yet been filled, the gate and blank latch fills the rest of the storage locations with blanks until the count of 112 is produced. When all storage locations have been filled, the addresser produces a count of 112 signal which clears the write prine latch, data available latch and directive flag logic circuitry, and provides an output to the red ribbon and paper control circuit to insure that, if the red ribbon is to be used, it is properly latched in. When the red ribbon is latched or if it is not to be used, an output is provided to the addresser circuit which provides an output to the enable print circuit to begin the printing operation. At the same time, the circuit, when in a printing mode, can also receive additional data from the universal asynchronous receiver transmitter to be stored in the other half of the memory.

Under the control of the multi-phase clock, the addresser then takes the messages stored in the memory out to the comparator which compares, under the control of the scan B signal, the data in the memory with the position of the drum of the printer. Under the control of the five bit counter, the information is shifted out of the memory to the comparator five bits at a time. Each character to be printed comprises five bits. Any matches between the five bits, which represent a character to be printed, with the drum position is supplied to the printer control circuit. The printer control circuit keeps track of the match signals and the column position with respect to each character which is being compared with the drum position. All of the characters stored in the memory are, in this manner, compared with the drum position and at the end of the comparison and under the control of the scan B signal and the enable print circuit, the printer control circuit receives an output from the trigger hammer circuit to fire all of the hammers which correspond to the matches in signals between the characters stored in the memory and those on the drum. The printer drum next advances to the next row of characters and the comparison process is performed again where the new row of characters is compared with the characters stored in the memory and this process is repeated until all of the rows of the printer drum have been compared with the data stored in the memory. When this process had been completed, the ribbon and paper control circuit shifts the paper through the printer and the data stored in the other half of the memory can now be printed.

As the data stored in the second half of the memory is then printed, the first half of the memory, which stored the data printed during the first operation, can now be rewritten.

FIGS. 6A–6G show the detail of the printer control circuits shown generally in FIG. 1. For a clearer understanding of the printer control circuits and its operation, the flow chart in FIG. 7 may be referred to along with the timing chart of FIG. 8.

FIG. 9 is a map of characters on a typical drum or a rotary drum printer. There are 21 columns of characters arranged in 16 rows. The data which is transmitted to the printer for printing is sent by data words comprising two characters each, each character comprising five bits. The characters are transmitted in order depending upon the column in which they are to be printed.

Assume the printing operation begins as the hammers of the printer are positioned over row 8. The data stored in the memory is supplied to the comparator a character at a time. The characters are compared to an output of a drum trace circuit which output corresponds to row 8. First character 1 is compared and, if there is a match, a 1 is stored in a shift register. Character 2 is then compared and a 1 for a match or a 0 for a non-match is stored and is shifted into the register and so on until all characters have been compared. When the register is full, a match for character 1 appears at the register output associated with column 1 and all other 1's and 0's appear at the appropriate column outputs of the register. The hammers associated with the 1 outputs are fired and the matched characters are printed.

The printer rotates to row 9 and the stored characters are next compared to row 9 by incrementing the drum trace circuit. Rows 10–15 and 0–7 are subsequently compared and suitable hammers are fired for each row. At the end of the row 7 comparison, the entire line of characters stored in the memory will have been printed and the printer can now begin printing the second line.

Figure 8:
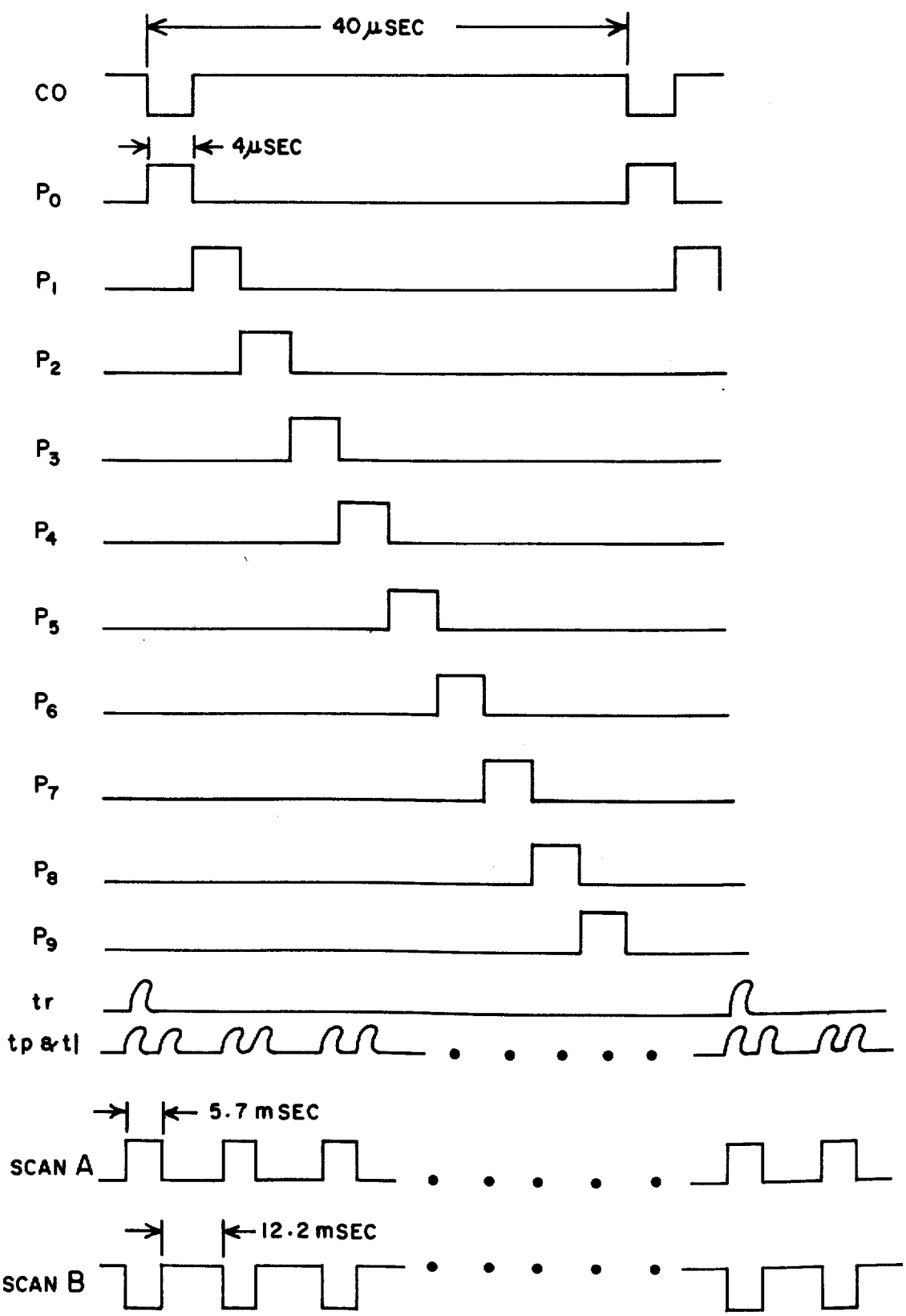
FIG. 8 shows the timing chart for the printer control circuit.

The timing chart of FIG. 8 shows the output signals from the multi-phase clock 201 shown in FIG. 6D. The output CO is provided by logic circuitry 202 connected to the multiphase clock. The multi-phase clock 201 is driven by the master oscillator 106. The outputs from the multi-phase clock control the timing of the printer control circuit.

One printer that can be used with this printer control circuit is the Seiko EP-101 Printer. This printer puts out a pulse tr per revolution of the drum and puts out pulses tp and tl which represent each row of charactors on the printing drum. In order to print a complete line of data or information, it can be seen that it is necessary to rotate the drum one complete revolution. The pulses tr are generated once per revolution but there are 16 tp and tl pulses generated per revolution one set of pulses for each row of characters on the printing drum. These pulses are supplied to a wave shaper circuit 203, FIG. 6D, which has its outputs connected to logic circuitry for controlling a D flip-flop 204 which provides the scan A and scan B pulses shown at the bottom of FIG. 8 at terminals F8 and F9. The character matching operation is performed during a scan A pulse and the writing operation into the memory is done during the scan B pulse time. Together, the outputs from the multi-phase clock and the scan A and scan B pulses control the timing of the circuit.

Figure 6A:
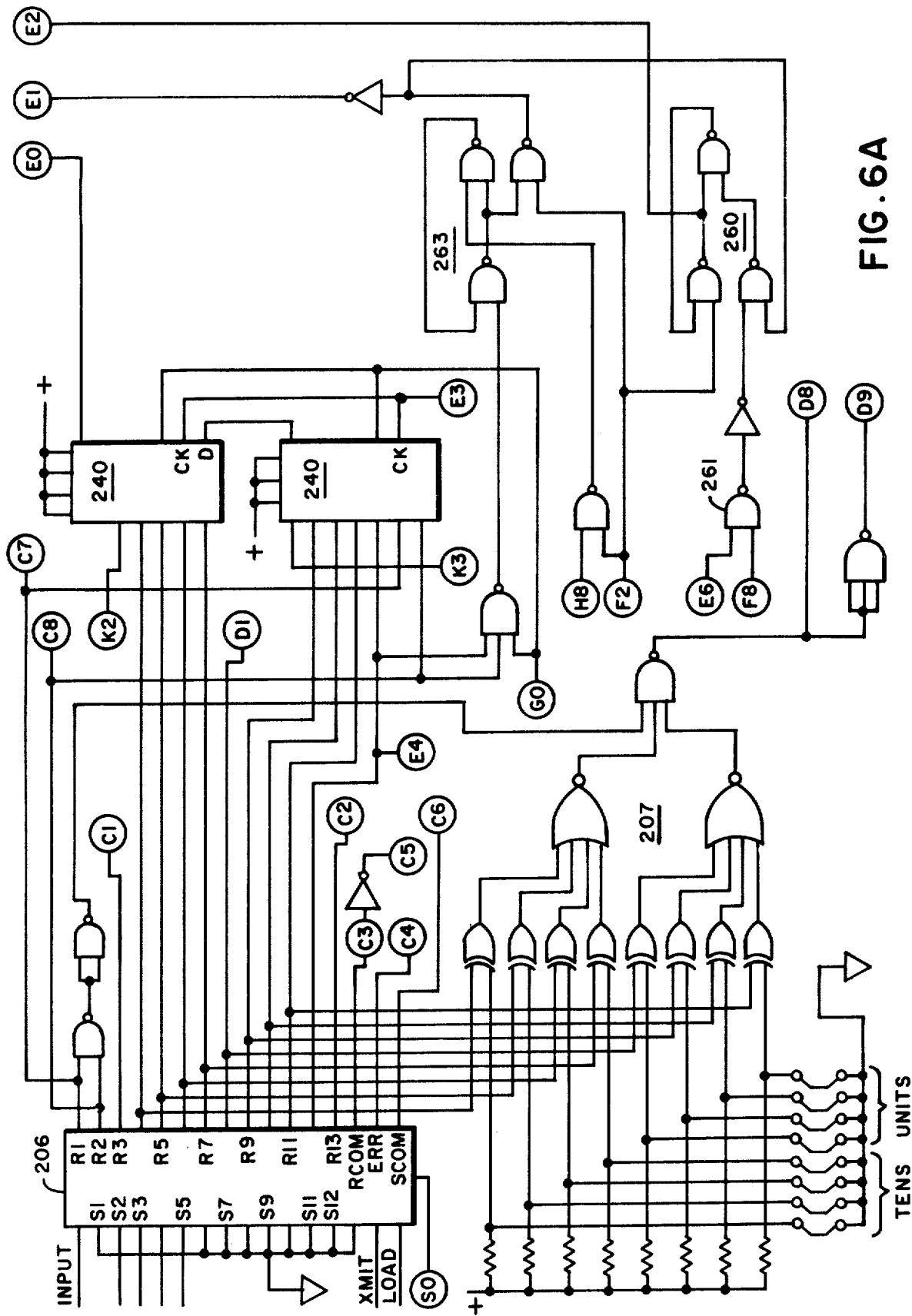

The incoming message is supplied at the input to the universal asynchronous receiver transmitter 206 shown in FIG. 6A. This universal asynchronous receiver transmitter is the same circuit as that shown in FIG. 5-5E and has been reshown in a simplified form for purposes of explanation of its operation with the associated printing control circuit. The message then is presented at outputs R1-R13 of the UART and the received complete signal, the error signal and the send complete signal are also supplied at appropriate output terminals. When an incoming address word is received, each remote station checks the address against its own address field to see if it is being addressed by the central processing unit. The address portion of an address word is provided by bits 4-11 which outputs from the UART are connected to one set of inputs of an address match circuit 207 the other set of inputs of which are connected to the tens and units straps of an address strap field. Designated ones of those straps are omitted and others are included to establish an address and identify each remote station. If the remote station shown in FIG. 6A has not been addressed by the central processing unit, nothing further happens in the control circuit and it then waits for a signal or an address word having its address. The FIG. 7 flow chart and the attached Appendix identifying each terminal will help in following the operation. If, however, the remote station shown in FIG. 6A has received its address, but there is an error in transmission, the remote station does nothing further and waits for another attempt by the central processor to address it. If no error has occurred, the receive complete signal is generated at output terminal C5.

The printer control circuit next checks to see whether the address word merely requests a polling of the status switches of the station. In the case of a printer control circuit, the status switches are shown in FIG. 6C and include switches which provide inputs to the universal asynchronous receiver transmitter for transmission to the central processing unit requiring the central processing unit to provide an all points log, a status summary, an alarm summary or to terminate a log printout.

Figure 6B:
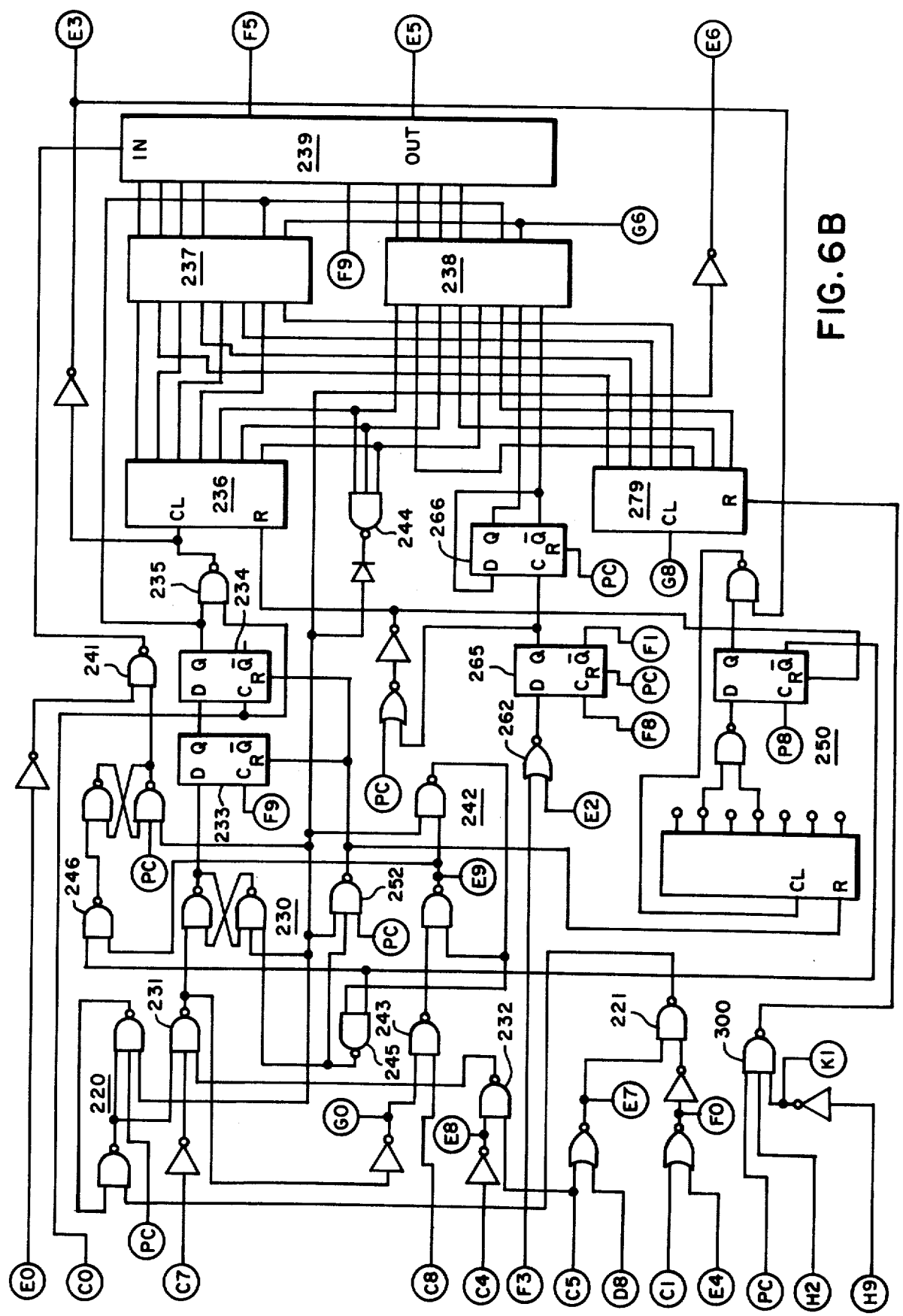
Figure 6C:
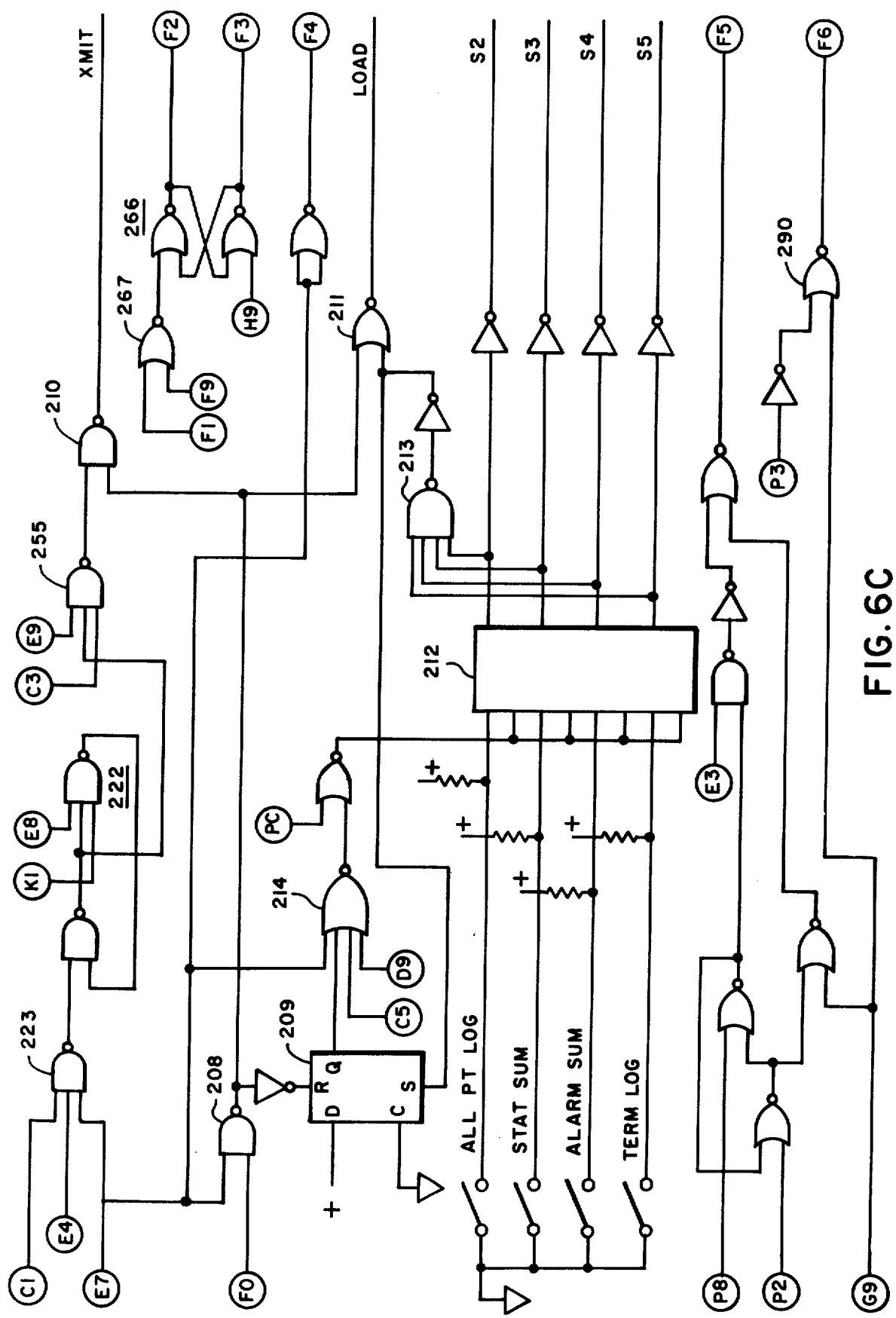
Figure 7A:
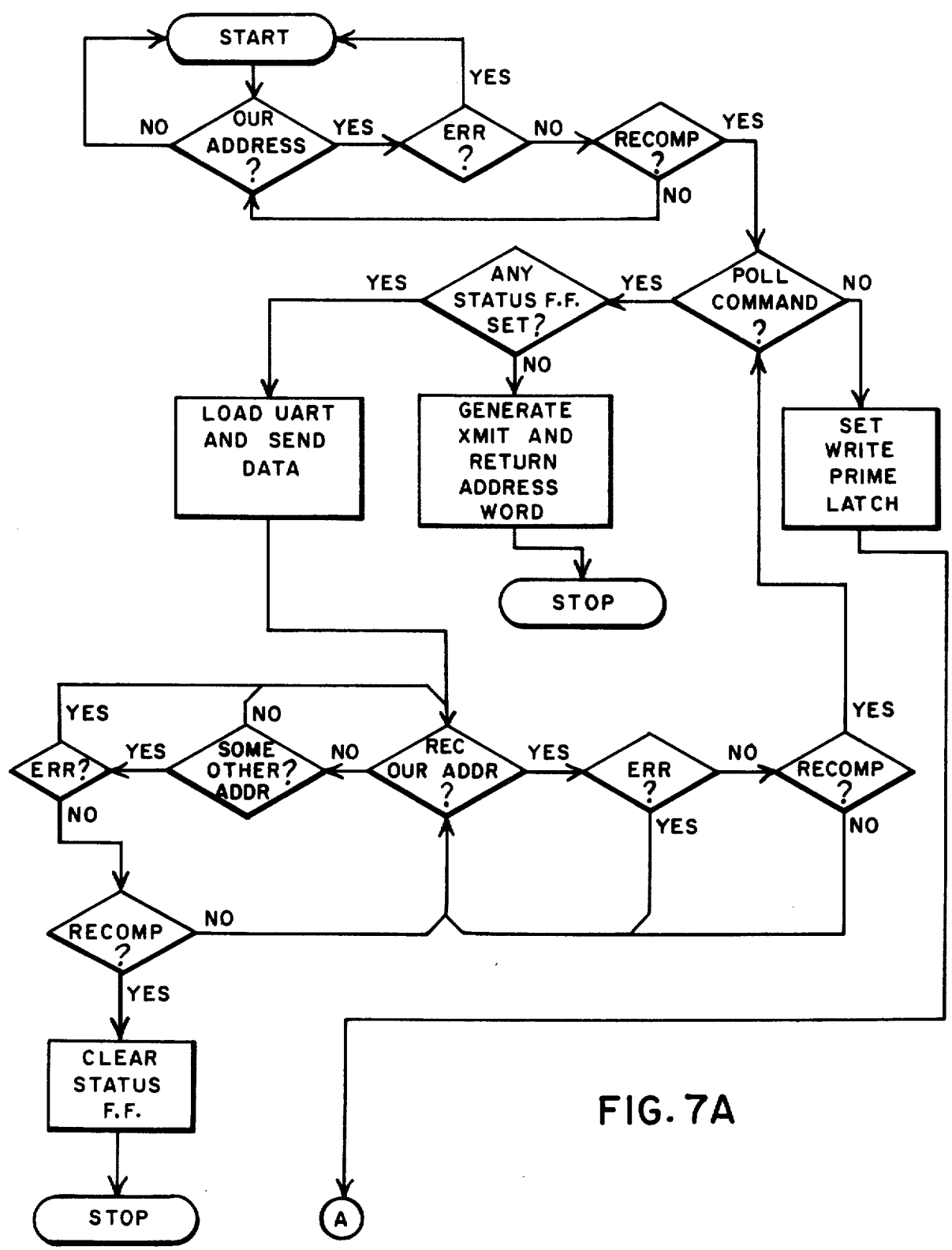
FIGS. 7A–7E show a flow chart of the operation of the printer control circuit.
Figure 7B:
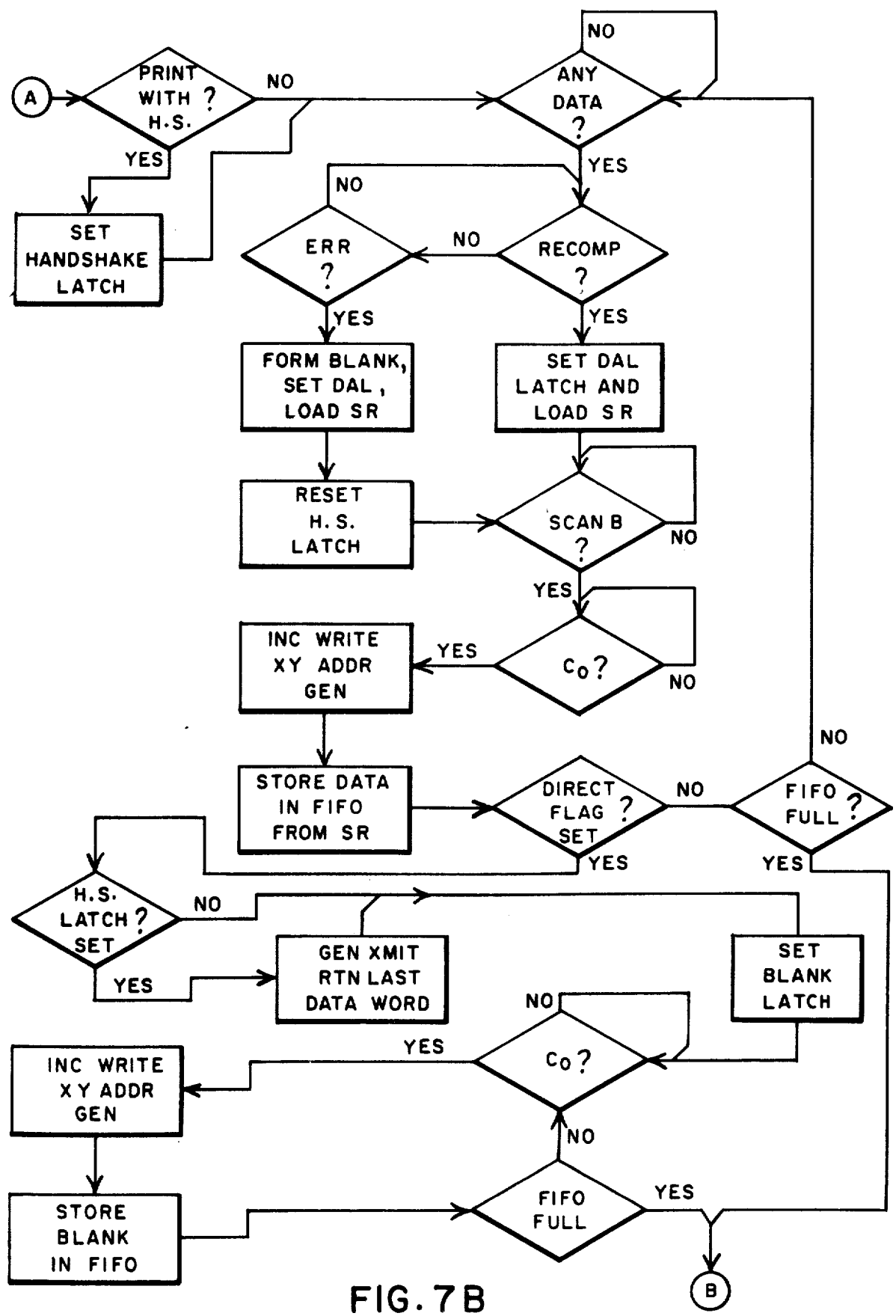
Figure 7C:
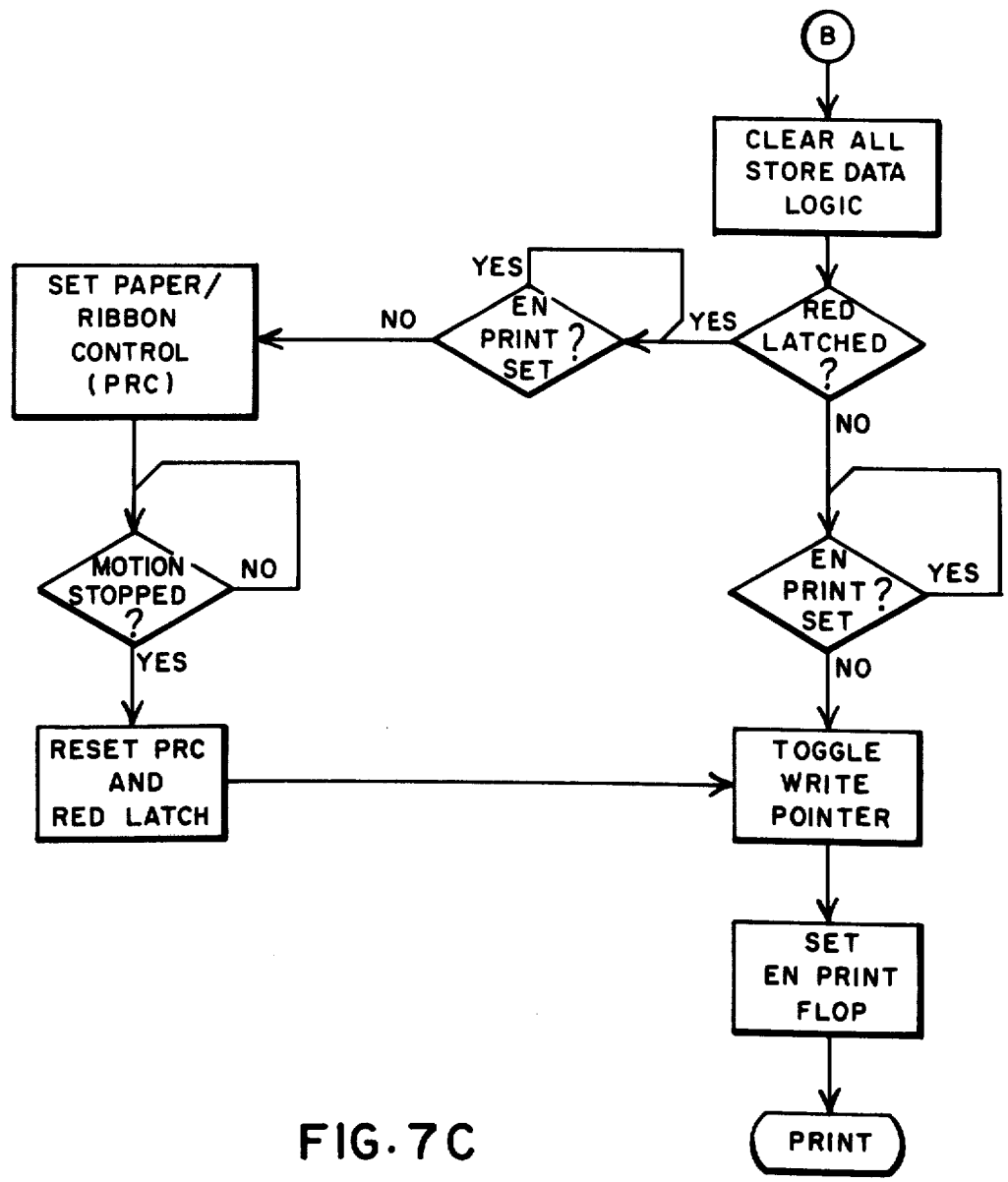
Figure 7D:
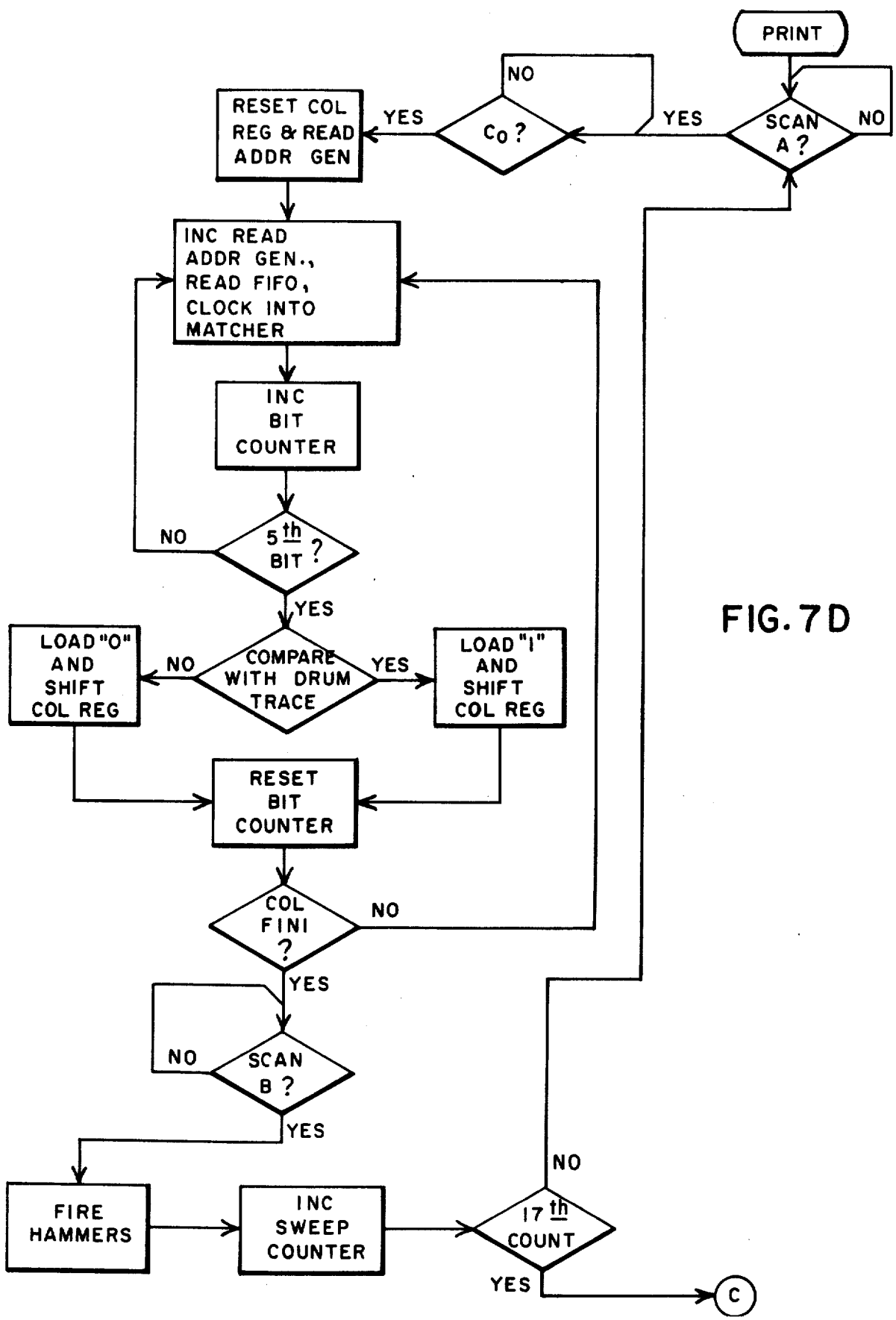
Figure 7E:
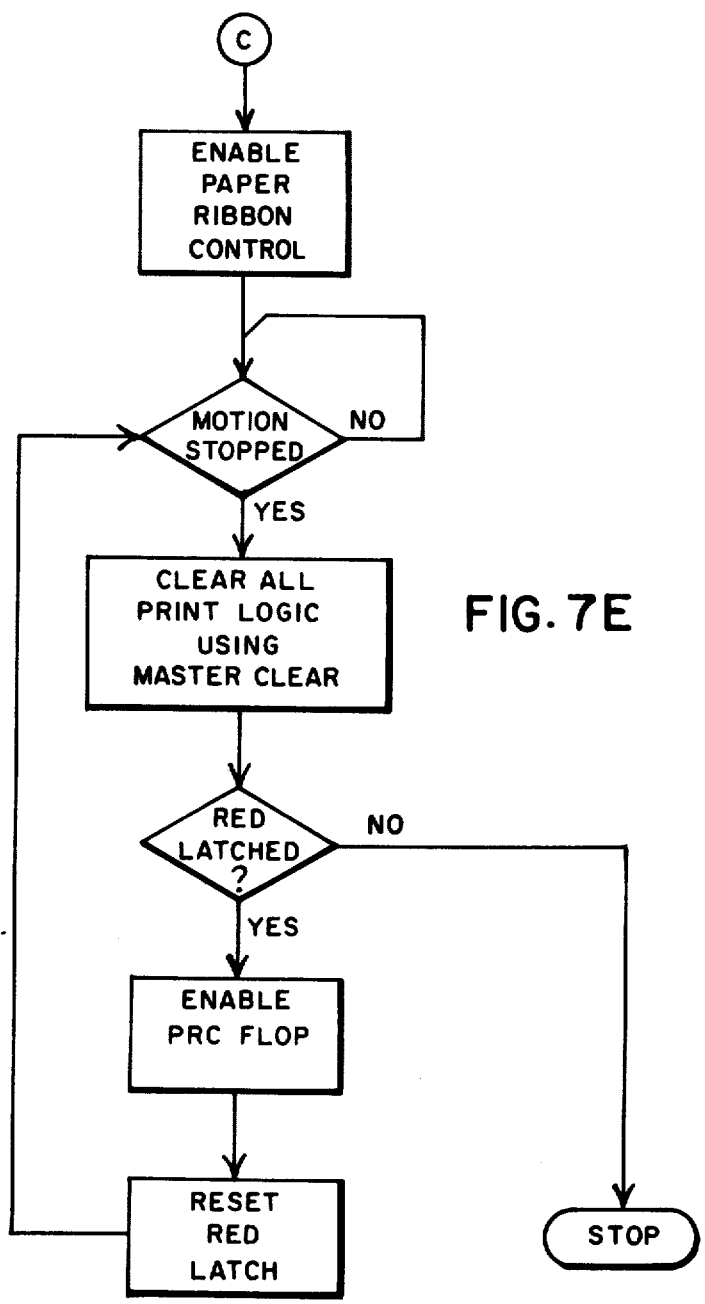

As can be seen by FIGS. 6C and 7A, if no status switch has been closed, none of the latches in latch gate 212 are set so that all of its outputs are high. Thus NAND gate 213 does not condition NOR gate 211 to generate a load signal. NAND gate 208 shown in FIG. 6C receives inputs from terminals E7 and F0. These terminals are shown in FIG. 6B. The signal on terminal E7 is comprised of the received complete signal from terminal C5 of FIG. 6A and the address match signal at terminal D8 which is generated by the address comparator 207 of FIG. 6A. The signal at terminal F0 is comprised of bits 3 and 12 of the address word. When all of these signals are generated and bits 3 and 12 are set for polling, NAND gate 208 will generate an output. Since NOR gate 211 is prevented from generating a load pulse, the output from NAND gate 208 will only generate a transmit pulse from NAND gate 210 to transmit the address word in the universal asynchronous receiver transmitter back to the central processing unit indicting no status switches have been set. The printing control circuit stops operation and awaits further messages from the central processing unit.

On the other hand, if one or more of the status switches have been closed, appropriate status flip-flops in latch 212 will be set to condition NOR gate 211 to generate a load signal and to set poll flip-flop 209. Poll flip-flop 209 prevents latch 212 from being reset. Upon generation of the receive complete, or address signals (E7) and R3 and R12 polling signals (F0), NAND gate 208 generates an output to reset polling flip-flop 209 which still does not reset latch 212 since NOR gate 214 is now inhibited by D9. The output from NAND gate 208 also generates a load signal through NOR gate 211 to load into the universal asynchronous receiver transmitter the S2-S5 outputs of latch 212 and a transmit signal through NAND gate 210 to transmit back to the central processing unit the S2-S5 information loaded into the universal asynchronous receiver transmitter.

If the next address word identifies this station as the station being addressed, the circuit checks for an error signal from the universal asynchronous receiver transmitter and, if there is an error, it waits until the universal asynchronous receiver transmitter transmits the message again. Upon a successful transmission where there is no error, the universal asynchronous receiver transmitter then provides a receiver complete signal which conditions the printer control circuit to again inquire whether or not the signal demands a polling operation. If it is a polling operation, the information in latch 212 is again transmitted to the CPU. If the next address word which has been received does not indicate that this is the station being addressed, but that some other station has been addressed, the signal is again checked for error and if there is no error and the received complete signal has been generated at terminal C5, NOR gate 214 provides an output to the latch circuit 212 to reset all the latches indicating that the CPU has received the status information correctly. Thus, the NOR gate 214 checks the receive complete, our address signals at terminal E7 and the address match (1) signal at D9 and the output from the polling flip-flop 209. When the latch 212 has been reset, the operation stops and waits for the next instruction from the central processing unit.

As indicated by the flow chart in FIG. 7, however, if the message which was received at the universal asynchronous receiver transmitter is not a polling command, the write prime latch 220 of FIG. 6B is set by the output from NAND gate 221 which combines the receive complete C5, address match (0) D8 signals at terminal E7 and the R3 and R12 signals at terminal F0 to set the write prime latch.

The circuit next looks at bits 3 and 12 (FIG. 7B) to determine whether a handshake is required. The handshake latch 222 (FIG. 6C) receives an input from NAND gate 223 which looks at R3, R12 and terminal E7 which is a composite of the receive complete and address match (0) signals. If bits 3 and 12, as discussed above, indicate that a handshake is to be provided, the handshake latch 222 is set by the output from NAND gate 223. If no handshake is to be provided, or, if a handshake is to be provided, the handshake latch is set, and then the circuit waits for a data word.

As mentioned previously, a data word has bit 1 set with a 0. The R1 output of the universal asynchronous receiver transmitter is connected to terminal C7 of FIG. 6B which, when bit 1 contains a 0 indicating a data word, provides an input to NAND gate 231. At the time a data word is received, the circuit waits for a receive complete signal and the universal asynchronous receiver transmitter checks for an error in transmission. If there is an error, the universal asynchronous receiver transmitter will generate an error signal but not a receive complete signal. If the universal asynchronous receiver transmitter has generated an error signal at terminal C4, the circuit of FIG. 6F generates two signals, an R3 and error signal at terminal K2 which is a combination of R3 and error at terminals C1 and C4 respectively and an R8 and error signal at terminal K3 which is a combination of R8 and error at terminals D1 and C4 respectively. These terminals, K2 and K3, are connected to the parallel to serial shift register 240 (FIG. 6A). Specifically, R1 at terminal C7 (FIG. 6B) together with the output from write prime latch 220 and the output from NAND gate 232 causes NAND gate 231 to produce an output to set data available latch 230. The output from NAND gate 231, through an inverter, applies a load signal at terminal G0 to load the blank into the parallel to serial shift register 240 (FIG. 6A). At the same time, the error signal at terminal C4 of FIG. 6B is connected through inverter to terminal E8 which is connected to reset the handshake latch 222 (FIG. 6C). The circuit next waits for a scan B pulse interval to load the blank, stored in register 240 (FIG. 6B) into memory 239 which may be a RCA 4061. If a receiver complete signal is generated indicating no error in transmission and if R1 is a 0 indicating a data word, terminal C7 provides an input to NAND gate 231. The write prime latch which has been set provides another input to NAND gate 231 and the output of NAND gate 232 which has an input from the error terminal C4 and the receive complete terminal C5 provides a third input to NAND gate 231. Upon receipt of the receive complete signal, gate 231 generates an output which is connected through an inverter to terminal CJ. The signal at terminal G0 is applied to a corresponding terminal in FIG. 6A for loading the data word stored in the universal asynchronous receiver transmitter into parallel to serial shift register 240. The output from gate 231 also sets the data available latch 230. The circuit now waits for a scan B pulse.

Upon generation of a scan B pulse at F9, flip-flop 233 is operated and the first positive, going edge of the CO pulse operates flip-flop 234 to provide an output to NAND gate 235 to allow the CO pulses shown in FIG. 8 to clock the write addresser 236 and to the multiplexer 237 and 238 to condition it to write the data into the memory. The write addresser operates through multiplexer 237 and 238 which may be a RCA 4019 for addressing the random access memory (RAM) 239 on a first come, first in basis. The circuit next waits for a CO pulse.

Upon the occurrence of the next and subsequent CO pulses, the information stored in the parallel to serial shift register 240 is clocked out by terminal E3 in FIG. 6A to terminal EO which operates through NAND gate 241 to provide an input to the memory 239 for storage. The CO pulses also clock the wirte addresser 236 and the output from the write addresser passes through multiplexer 237 and 238 for writing into the RAM 239 the data at its input.

Data is transmitted by the central processing unit in a word which contains two data characters each comprising five bits. The serial register clock pulses, at terminal E3, which clock the information out of the parallel to serial shift register 240 into the memory also clocks ten bit counter 250, FIG. 6B. The D flip-flop in the ten bit counter 250 receives clocking pulses from P8 of the multi-phase clock 251 shown in FIG. 6D for providing an output from the ten bit counter to NAND gate 245. As the tenth bit is written into the memory 239, the output from the flip-flop of ten bit counter 250 is passed through NAND gate 245 for resetting the data available latch 230 to prevent any further operation of the write addresser 236 until the next data word is received. When the next data word is received, bit 1 sets the data avaialble latch 230 and the ten bits comprising the next two characters are written into the memory 239 under the control of the ten bit counter 250 and CO pulses.

At this point, NAND gate 243 which is conditioned by the output of NAND gate 231, checks bit 2 of each data word, bit 2 appearing on terminal C8. As soon as a signal is received on terminal C8, the directive flag latch 242 is set which indicates that the word having the directive flag bit set with a 1 is the last data word transmitted by the central processing unit. Thus, the data words being supplied by the central processing unit and received by the universal asynchronous receiver transmitter are continuously written into the random access memory 239 under the control of the CO pulses and the scan B pulses and the directive flag latch 242 waits for a directive flag bit. If the directive flag bit is not received, the circuit checks to see if the random access memory is full and, if not, it receives additional data and performs the above noted operation. The NAND gate 244 decodes the output from the write address generator 236 and, when a count of 112, which is the number of possible storage locations in one half of the RAM 239, is reached, NAND gate 244 issues an output through the diode. Thus, until an output from NAND gate 224 occurs, the circuit will continue to write in the incoming words in the memory and when the memory is full the hardware proceeds to the next step of its operation. However, in all cases the directive flag bit should be set with a 1 in the last data word. When the directive flag latch 242 has been set by the directive bit indicating that the last word received is the final data word transmitted by the central processing unit, and an output is supplied to NAND gate 245 from latch 242 which prevents any further output from the ten bit counter 250 resetting the data available latch 230 and at the same time the output from the directive flag latch 242 provides an output to NAND gate 246 for enabling it to set the blank latch 254.

The output from the directive latch 242 is also connected to NAND gate 255 (FIG. 6C). The circuit checks to see if the handshake latch has been set and, if it has not, the system proceeds to set the blank latch and fill memory 239 with blanks. If handshake latch 222 has been set, the directive flag signal at terminal E9 of FIG. 6B is connected to E9 of FIG. 6C for passing the handshake output from handshake latch 222 through the NAND gate 255 and through NAND gate 210 to supply a transmit pulse to the universal asynchronous receiver transmitter for returning the last data word received to the central processing unit under the operation as described in association with the universal asynchronous receiver transmitter circuit above.

As the last data word is written into the memory 239, an output from the ten bit counter 250 is transmitted through NAND gate 246 to set blank latch 254. When NAND gate 246 has received the directive latch output, it is enabled to pass through the tenth bit, which is allowing the writing of the data word last received into the memory 239, to pass through to set blank latch 254 which inhibits any further output from the parallel to serial shift register 240 from being passed through NAND GATE 241 and to force a logic 1 into the RAM 239 input. The directive latch output also prevents the resetting of the data available latch 230 which allows CO pulses to continue to clock the write addresser 236 to write logic ones in the memory 239 until all memory locations in the first half of the memory 239 have been filled. Any five bit character in the memory 239 after the setting of the blank latch will represent a blank since binary values equal to or greater than 16 is interpreted as a blank for printing purposes.

When NAND gate 244 generates the count of 112 signal, all of the logic connected to this output are reset and also a 112 output is produced on terminal E6 of FIG. 6B which is connected to a corresponding terminal on FIG. 6A. This output combined with a scan A output pass through NAND gate 261 and logic circuitry 260 to produce an output at terminal E2, termed the 112 and GO signal. Logic 260 cannot operate until the red latch signal from red latch 263 has been produced. This circuit receives an input over terminal H8 from the paper ribbon and control circuit to assure that, if a red printing operation is to occur, the red ribbon has been set prior to the beginning of the printing operation. Once the motion has stopped, if the red ribbon is to be used, the 112 and GO signal is supplied to NOR gate 262 (FIG. 6B) to toggle the flip-flop 265 at the next scan A pulse. This sets the write pointer flip-flop 266 which, operating through the multiplexer 237-238 controls the highest order storage bit location in the memory 239 for conditioning the memory 239 for writing into the second half and reading out of the first half. At the same time, the Q output from flip-flop 265 sets the enable print latch 340 shown in FIG. 6C through NOR gate 267. At this point, the printing operation can be started.

When the enable print latch 340 has been set, an enable print (1) signal is generated at terminal F3 of FIG. 6C which is connected to a corresponding terminal in FIG. 6D for operating NAND gate 270 to provide an output to the D terminal of flip-flop 271. When a scan A pulse is generated, it is connected through a pair of inverters to latch 272 for conditioning NAND gate 273 to transmit the matching signals, to be discussed hereinbelow, to the column shift register 274 shown in FIG. 6G. The scan A pulse also, through the inverters, clocks the D flip-flop 271 to provide an output to the D terminal of flip-flop 275 which conditions, upon the receipt at its clock terminal of the next CO pulse from CO generator 202, NAND gate 276 to pass CO pulses and also conditions the multiplexer at terminal G6 to read the data in the memory. The output from flip-flop 275 also causes NOR gate 313 to supply a signal to NAND gate 312 which, together with a PO pulse supplies a column reset signal through NAND GATE 311 to terminal G4. The column shift register 274 is thus reset. NAND gate 281, upon the receipt of a signal from NAND gate 282, uses a P2 pulse for providing a column clock output to clock a 1 into the serial to parallel shift register 274 in FIG. 6G. This signal is called the column fini signal which is produced at terminal F7 when the serial to parallel shift register 274 is full.

The CO pulses from NAND gate 276 are supplied to the clock terminal of five bit counter 277. These pulses are also supplied to NAND gate 278, which together with the pulse P1, provides a read P1 output at teminal G8. The signal is connected to a corresponding terminal in FIG. 6B for clocking read addresser 279 to take the information previously stored in the first half of the memory 239 out and presents that information at terminal E5 to serial to parallel shift register 280 in FIG. 6D for comparing with the drum position.

The CO pulse from the NAND gate 276 of FIG. 6D is also supplied to terminal G9 which forms a read XY clock signal which is supplied to a corresponding terminal in FIG. 6C to an input of NOR gate 290. The other input of NOR gate 290 receives the output P3 from the multiphase clock 251 of FIG. 6D which provides an output, read clock P3, on the terminal F6 which is connected to a corresponding terminal in FIG. 6D for clocking the data at terminal E5 into the serial to parallel register 280.

When the five bit counter 277 has reached the count of five indicating that five bits comprising a character have been pulled out of the memory and placed into the serial to parallel shift register 280, the counter provides an output through NAND gate 281 to terminal G7 which is a column clock signal. It also provides an output through NAND gate 293 and 294 to reset the five bit counter 277 using P8 from multi-phase clock 251.

When the five bits have been pulled out of the memory, matcher 292 compares the character presented at the output of serial to parallel shift register 280 with the drum position output from drum trace circuit 291 and produces a 1 at terminal H3, referred to as the column data terminal, if there is a match and a 0 if there is no match. This information is supplied to a corresponding terminal if FIG. 6G which is connected to the input of the serial to parallel shift register 274. The column clock (1) input at terminal G7 next shifts this information into the serial to parallel shift register 274.

Figure 6G:
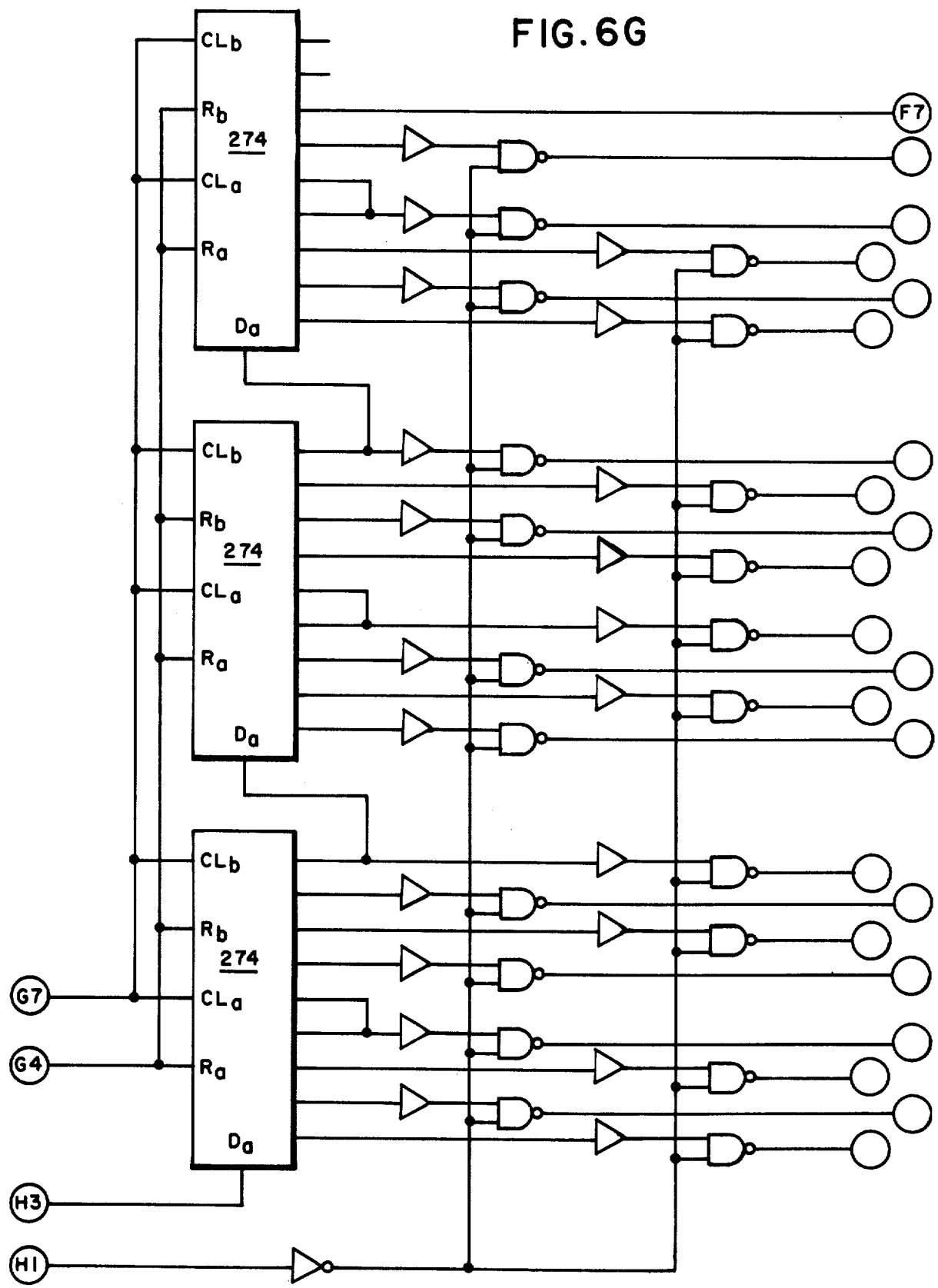

The bits stored in the memory continue to be pulled out and compared with the drum position five bits at a time and the match and non-match signals stored in the serial to parallel shift register 274 of FIG. 6G until the column fini signal which was initially stored in the serial to parallel shift register 274 is produced at terminal F7. This output prevents any further CO pulses from being transmitted through NAND gate 276 in FIG. 6D and also provides an input to NAND gate 300 of FIG. 6B to reset read addresser 279.

The next scan B pulse at terminal F9 is supplied through NAND gate 301 of FIG. 6D to provide a trigger hammer signal at terminal H1 which signal is connected to a corresponding terminal in FIG. 6G to enable the NAND gate connected thereto to pass the outputs from the serial to parallel shift register 274 to the hammer firing circuits of the printer. Any output from the serial to parallel shift register 274 which is a 1 is passed through these NAND gates and fires the hammers to print the corresponding characters on the printer drum. Thus, one row of characters on the printer drum have been compared with the data stored in the memory to fire certain hammers. To complete the printing of an entire line, all 16 rows of characters on the drum must be compared with the data stored in the memory 239.

The drum rotates to its next position which generates a new set of scan A and scan B pulses to begin the comparison operation again. The scan B pulse which has operated the hammers also resets flip-flops 271 and 275 which increment the sweep counter 310 and the next scan A pulse is transmitted through to begin the comparison operation as described above. After all 16 rows on the printer drum have been compared with the information stored in the first half of memory 239, the sweep counter 310 provides an output on the count of 17. The count of 17 signal is transmitted through NAND gate 311 to terminal G4 which provides a reset column signal to the corresponding terminal on FIG. 6G for resetting the serial to parallel shift register 274. The count of 17 signal also prevents NAND gate 270 from passing the enable print signal on terminal F3 through to the D terminal of flip-flop 271. The count of 17 is also connected to terminal G5 which is connected to a corresponding terminal in FIG. 6E to allow paper and ribbon control circuit 320 to feed the paper through the printer for the next line of printing and for controlling the ribbon. When the ribbon is fed through for the next printing operation, the paper take up and paper feed reel have been incremented for a new line of printing, the paper and ribbon control generates a reset red-1 signal for resetting the red latch 263 in FIG. 6A and generates a master clear signal at terminal H9. This master clear signal resets sweep counter 310 of FIG. 6D, resets read addresser 279 through NAND gate 300 of FIG. 6B and resets enable print latch 266 of FIG. 6C. When the red latch circuit 263 has been reset, all operation of the circuit ceases and it waits for the next printing operation.

During this printing operation, the other half of the memory can be written into as per the operation described above and at the end of the printing operation with respect to the first half of the RAM 239, the printing operation can begin with the second half of the memory. This operation is under the control of the write pointer flip-flop 266 which is reset by the next clock pulse from flip-flop 265 which is clocked by the scan A pulses.

The entire character comparison operation for one row is accomplished during a scan A pulse although several scan B pulses may be necessary to write the incoming data into the memory. During scan B pulses one half of the memory can be written and during scan A pulses the other half of the memory can be read out for printing.

Many of the gates and latches and flip-flops shown in the drawings have a terminal labeled PC connected thereto. This terminal is a power clear terminal which resets all of the latches, gates, flip-flops when power is initially applied to the printing control circuit.

The embodiments of the invention in which an exclusive property or right is claimed are defined as follows:

1. A system for remotely controlling the printing of data at a plurality of printer locations wherein a central processing unit is connected over a serial transmission channel to a plurality of printers, said central processing unit first serially addressing all the printers selected to print the data and then serially transmitting out in one transmission the data in the form of data words on the transmission channel for printing by all the selected printers, said system comprising:

central processing means for first serially transmitting addresses associated with said selected printers and for then serially sending out in one transmission data to be printed by all said selected printers;

a plurality of printers each comprising receiving means for receiving said serially transmitted addresses, address field means for establishing a particular address for its associated printer, address matching means for providing an address match signal when there is a match between one of said addresses transmitted by said central processing means and said particular address established by said address field means, and latch means responsive to said address match signal for conditioning its associated printer to print out the data transmitted by said central processing means and for maintaining said condition even though its associated printer receives other addresses; and, transmission channel means for connecting said central processing means to said plurality of printers.

2. The system of claim 1 wherein each of said printers comprises means responsive to said data words for initiating the printing of said data.

3. The system of claim 2 wherein said means responsive to said data words include logic circuit means responsive to at least one bit in said data words for initiating said printing.

4. The system of claim 3 wherein each of said printers comprises storage means for storing said signal to be printed and means for generating a signal when said storage means is full, said latch means responsive to said signal for resetting said latch means.

5. The system of claim 1 wherein said receiving means comprises means for serially receiving said address and for displaying said addresses in parallel form and said address matching means comprises parallel input means for receiving said addresses in parallel form.

6. The system of claim 5 wherein each of said printers comprises means responsive to said data words for initiating the printing of said data.

7. The system of claim 6 wherein said means responsive to said data words includes logic circuit means responsive to at least one bit in said data words for initiating said printing.

8. The system of claim 7 wherein each of said printers comprises storage means for storing said data to be printed and means for generating a signal when said storage means is full, said latch means responsive to said signal for resetting said latch means.

* * * * *